(12) United States Patent
Goh et al.

(10) Patent No.: US 10,975,307 B2
(45) Date of Patent: Apr. 13, 2021

(54) LIQUID CRYSTALLINE EPOXY COMPOUND WITH TERMINAL MESOGEN CONNECTED BY FLEXIBLE LINKAGE AND METHOD FOR PREPARING THE SAME

(71) Applicant: KOREA INSTITUTE OF SCIENCE AND TECHNOLOGY, Seoul (KR)

(72) Inventors: Munju Goh, Jeollabuk-do (KR); Hyeonuk Yeo, Jeollabuk-do (KR); Nam Ho You, Jeollabuk-do (KR); Se Gyu Jang, Jeollabuk-do (KR); Seokhoon Ahn, Jeollabuk-do (KR); Young Soo Kim, Jeollabuk-do (KR)

(73) Assignee: KOREA INSTITUTE OF SCIENCE AND TECHNOLOGY, Seoul (KR)

(*) Notice: Subject to any disclaimer, the term of this patent is extended or adjusted under 35 U.S.C. 154(b) by 72 days.

(21) Appl. No.: 15/865,259

(22) Filed: Jan. 9, 2018

(65) Prior Publication Data
US 2018/0201835 A1   Jul. 19, 2018

(30) Foreign Application Priority Data

Jan. 17, 2017 (KR) .................. 10-2017-0008181

(51) Int. Cl.
| | | |
|---|---|---|
| G02F 1/1333 | (2006.01) | |
| C09K 19/38 | (2006.01) | |
| C09K 19/12 | (2006.01) | |
| C09K 19/30 | (2006.01) | |
| C09K 19/32 | (2006.01) | |
| C09K 19/22 | (2006.01) | |
| C09K 19/16 | (2006.01) | |
| C09K 19/24 | (2006.01) | |
| C09K 19/34 | (2006.01) | |
| C09K 19/20 | (2006.01) | |
| C09K 19/04 | (2006.01) | |

(52) U.S. Cl.
CPC ............ *C09K 19/388* (2013.01); *C09K 19/12* (2013.01); *C09K 19/16* (2013.01); *C09K 19/22* (2013.01); *C09K 19/24* (2013.01); *C09K 19/3003* (2013.01); *C09K 19/322* (2013.01); *C09K 19/3411* (2013.01); *C09K 2019/0448* (2013.01); *C09K 2019/122* (2013.01); *C09K 2019/2035* (2013.01); *C09K 2019/3009* (2013.01); *C09K 2019/323* (2013.01); *C09K 2019/328* (2013.01)

(58) Field of Classification Search
CPC ...... C09K 19/388; C09K 19/12; C09K 19/16; C09K 19/22; C09K 19/24; C09K 19/3003; C09K 19/322; C09K 19/3411; C09K 2019/0448; C09K 2019/122; C09K 2019/2035; C09K 2019/3009; C09K 2019/323; C09K 2019/328; G02F 1/1333

USPC ...................................... 252/299.61
See application file for complete search history.

(56) References Cited

U.S. PATENT DOCUMENTS

| | | | |
|---|---|---|---|
| 2010/0016498 A1 | 1/2010 | Kaji et al. | |
| 2018/0201835 A1* | 7/2018 | Goh ................ | C09K 19/24 |

FOREIGN PATENT DOCUMENTS

| | | |
|---|---|---|
| DE | 19639445 A1 | 4/1998 |
| JP | 2001066433 A | 3/2001 |
| JP | 2004297470 A | 10/2004 |
| JP | 2012177060 A | 9/2012 |
| JP | 5681152 B2 | 3/2015 |
| KR | 101262138 B1 | 5/2013 |
| KR | 1020140099870 A | 8/2014 |
| KR | 101505490 B1 | 3/2015 |

OTHER PUBLICATIONS

Akatsuka et al., "Study of High Thermal Conductive Epoxy Resins Containing Controlled High-Order Structures", Journal of Applied Polymer Science, 2003, pp. 2464-2467, vol. 89, Wiley Periodicals, Inc.
Giang et al., "Effect of Backbone Moiety in Epoxies on Thermal Conductivity of Epoxy/Alumina Composite", Polymer Composites, 2013, pp. 468-476, Society of Plastics Engineers.
Ochi et al., "Bonding Properties of Epoxy Resins Containing Two Mesogenic Groups", Journal of Applied Polymer Science, 2004, pp. 3721-3729, vol. 92, Wiley Periodicals, Inc.
Ribera et al., "Lightly Crosslinked, Mesomorphic Networks Obtained through the Reaction of Dimeric, Liquid-Crystalline Epoxy—Imine Monomers and Heptanedioic Acid", Journal of Polymer Science, 2006, pp. 6270-6286, vol. 44, Wiley Periodicals, Inc.
Shiota et al., "Synthesis and Curing of Novel LC Twin Epoxy Monomers for Liquid Crystal Thermosets", Journal of Polymer Science, 1996, pp. 1291-1303, vol. 34, John Wiley & Sons, Inc.

* cited by examiner

*Primary Examiner* — Geraldina Visconti
(74) *Attorney, Agent, or Firm* — Cantor Colburn LLP

(57) ABSTRACT

Disclosed is a liquid crystalline epoxy compound wherein an epoxy group is positioned at a side chain of the longer direction of a mesogen group and each of the mesogen group and the epoxy group is connected to the center of the molecular structure through a flexible linkage. Since the liquid crystalline epoxy compound includes an epoxy group positioned at a side chain of the longer direction of a mesogen group and each of the mesogen group and the epoxy group is connected to the center of the molecular structure through a flexible linkage, the interaction between the mesogens in a cured resin product occurs significantly without weakening even after curing, thereby improving the heat conductivity of the resin compound through the active heat transfer between the mesogens.

6 Claims, 12 Drawing Sheets

LIQUID CRYSTALLINE EPOXY COMPOUND WITH TERMINAL MESOGEN CONNECTED BY FLEXIBLE LINKAGE AND METHOD FOR PREPARING THE SAME

CROSS-REFERENCE TO RELATED APPLICATION

This application claims priority to Korean Patent Application No. 10-2017-0008181, filed on 17 Jan. 2017, and all the benefits accruing therefrom under 35 U.S.C. § 119, the contents of which in its entirety are herein incorporated by reference.

BACKGROUND

1. Field

The present disclosure relates to a liquid crystalline epoxy compound and a method for preparing the same. More particularly, the present disclosure relates to a liquid crystalline epoxy compound wherein an epoxy group is positioned at a side chain of the longer direction of a mesogen group and each of the mesogen group and the epoxy group is connected to the center of the molecular structure through a flexible linkage, a method for preparing the same and a cured resin product obtained therefrom.

2. Description of the Related Art

An epoxy resin is a thermosetting resin including a network polymer formed by ring opening of an epoxy group occurring when an epoxy compound having at least two epoxy groups in its molecule is mixed with a curing agent. Such an epoxy resin has excellent chemical resistance and durability and shows a low volumetric shrinkage during curing, and thus has been used as an essential high-functional material in various industrial fields, including adhesives, paint, electronics/electrics, civil engineering/construction, or the like.

Particularly, in the field of electronics/electrics, electronic part circuits including highly integrated devices have been developed recently in order to provide electronic instruments with a compact size and high quality. Thus, heat emission has increased in such electronic part circuits. Such an increase in heat emission in electronic part circuits causes an increase in internal temperature of an electronic instrument, resulting in dysfunction of a semiconductor device, variations in characteristics of resistors. This finally causes a problem of degradation of the service life of an electronic instrument. Particularly, in the case of a light emitting diode (LED) device used widely in the field of lighting or display, higher heat emission appears due to the nature of the device. Therefore, there has been an increasing need for a solution about heat radiation and a highly heat conductive material used therefor.

Currently, the most widely used method for increasing the heat conductivity of an epoxy resin is mixing an epoxy resin with a heat conductive filler, such as aluminum oxide or aluminum nitride, to provide a composite material. The composite materials obtained by the method shows relatively higher heat conductivity while maintaining the advantages of the conventional epoxy resin. However, since such a filler has fixed physical properties to a certain degree, it is difficult to make a significant change, except an increase in content of a filler, in order to obtain a composite material having higher conductivity. In this case, manufacture of such a composite material becomes difficult due to an excessively increased amount of filler or an unexpected disadvantage may be generated in terms of the other physical properties.

Therefore, some studies have been conducted to obtain a composite material having improved heat conductivity by increasing the heat conductivity unique to an epoxy resin as well as a filler, while not increasing the amount of a filler. In fact, after studying about the effect of a filler and epoxy resin upon the heat conductivity of an epoxy resin-based composite material according to the Lewis-Nielsen model for approximating the heat conductivity of a composite material theoretically, it is reported that the heat conductivity unique to an epoxy resin, rather than that of a filler, may have a more significant effect upon the heat conductivity of a composite material (Non-Patent Document 1).

In the case of a bisphenol A diglycidyl ether (DGEBA) type epoxy resin, a most widely used epoxy resin in the industrial fields, it is known that the epoxy resin forms a three-dimensional network crosslinked structure after curing. Although such a three-dimensional structure is known to have an advantage in that it provides a material with excellent durability and anti-corrosive property, it is disadvantageous in terms of heat conductivity because scattering of phonon known to function to transfer heat occurs predominantly. In fact, in the case of a cured product of DGEBA epoxy resin, it shows a low heat conductivity of about 0.2 W/mK.

Therefore, some studies have been conducted about a liquid crystalline epoxy resin in order to convert such a three-dimensional structure into a more aligned one- or two-dimensional structure. Such a liquid crystalline epoxy resin forms a cured resin product having an aligned structure through the strong interaction between mesogens. In the aligned structure, vibratory transfer of phonons between mesogens occurs in the same direction, thereby providing high heat conductivity. For example, in the case of a cured resin product using a liquid crystalline epoxy compound having a phenyl benzoate type mesogen, it is reported that the cured resin product shows a heat conductivity (0.96 W/mK) at least about 4 times higher than the heat conductivity of DGEBA epoxy resin (Non-Patent Document 2).

Meanwhile, some studies have been also conducted to improve the physical properties of a liquid crystalline epoxy compound and cured resin product by introducing a flexible linkage to the compound. When introducing a flexible linkage, the solubility of the compound increases, thereby facilitating the handling of the compound during a process (Patent Document 1), the interaction between mesogens may be controlled to allow a change in a temperature range where liquid crystallinity appears (Non-Patent Document 3), the aligned shape in a liquid crystal state may be also changed (Non-Patent Document 4), and the reactivity of an epoxy group may be controlled to adjust the curing rate (Non-Patent Document 5).

However, according to the studies of the present disclosure, most of such compounds have mesogens therein and epoxy groups are present at both terminals. In this case, when a cured resin product is formed through ring-opening of an epoxy group, mesogens may also be incorporated into the network structure, and thus the one- or two-dimensional structure formed by mesogens before curing may be weakened due to the property of a network structure forming a three-dimensional structure with ease. In this case, it is not possible to improve the heat conductivity efficiently by introducing a liquid crystalline epoxy compound.

REFERENCES

Patent Documents (Patent Document 1) Korean Patent Laid-Open No. 10-2014-0118228

Non-Patent Documents (Non-Patent Document 1) Polymer Composites, 2013, 34, 468.
(Non-Patent Document 2) Journal of Applied Polymer Science, 2003, 89, 2464.
(Non-Patent Document 3) Journal of Applied Polymer Science, 2004, 92, 3721.
(Non-Patent Document 4) Journal of Polymer Science: Part A: Polymer Chemistry, 1996, 34, 1291.
(Non-Patent Document 5) Journal of Polymer Science: Part A: Polymer Chemistry, 2006, 44, 6270.

SUMMARY

The present disclosure is directed to providing a method for preparing a liquid crystalline epoxy compound which causes no weakening of interaction between mesogen groups and allows mesogens to form a one- or two-dimensional structure, and a liquid crystalline epoxy compound and cured resin product obtained thereby.

The present disclosure is also directed to providing a method for preparing a liquid crystalline epoxy compound, which allows binding of an epoxy group under a mild condition in a short time and minimizes a ring-opening reaction in an epoxy group binding reaction system to inhibit the polymerization of an epoxy compound, and a liquid crystalline epoxy compound obtained thereby.

Further, the present disclosure is directed to providing a method for preparing a liquid crystalline epoxy compound which ensures excellent moldability and liquid crystal temperature range, has improved heat conductivity and thus shows high heat radiation property, and a liquid crystalline epoxy compound and cured resin product obtained thereby.

In one aspect, there is provided a liquid crystalline epoxy compound wherein an epoxy group is positioned at a side chain of the longer direction of a mesogen group and each of the mesogen group and the epoxy group is connected to the center of the molecular structure through a flexible linkage.

In another aspect, there is provided a method for preparing a liquid crystalline epoxy compound, including the steps of: 1) preparing a liquid crystalline alkyl halide compound having a mesogen group; 2) preparing a liquid crystalline ester derivative from the liquid crystalline alkyl halide compound; 3) preparing a liquid crystalline carboxylic acid derivative from the liquid crystalline ester derivative; and 4) preparing a liquid crystalline epoxy compound represented by the following Chemical Formula 1-1 from the liquid crystalline carboxylic acid derivative:

[Chemical Formula 1-1]

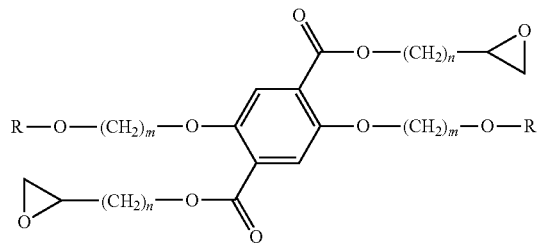

wherein R represents a mesogen group, and each of m an n independently represents an integer of 1 or more.

In still another aspect, there is provided a method for preparing a liquid crystalline epoxy compound, including the steps of: 1) preparing a liquid crystalline alcohol derivative having a mesogen group; 2) preparing a carboxylic acid derivative whose hydroxyl group is protected; 3) preparing a liquid crystalline ester derivative from the liquid crystalline alcohol derivative and the carboxylic acid derivative whose hydroxyl group is protected; 4) preparing a liquid crystalline ester derivative whose hydroxyl group is deprotected from the liquid crystalline ester derivative; and 5) preparing a liquid crystalline epoxy compound represented by the following Chemical Formula 2-1 or 3-1 from the liquid crystalline ester derivative whose hydroxyl group is deprotected:

[Chemical Formula 2-1]

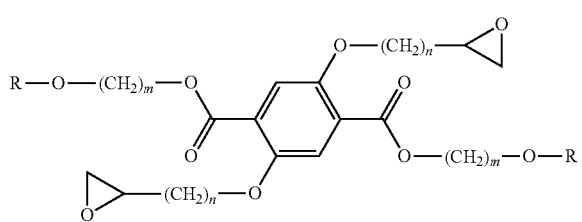

[Chemical Formula 3-1]

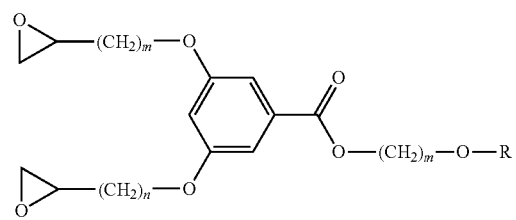

wherein R, m and n are the same as defined in the above.

In yet another aspect, there is provided a cured product of liquid crystalline epoxy resin obtained by reacting the liquid crystalline epoxy compound with a curing agent.

According to some embodiments of the present disclosure, the liquid crystalline epoxy compound includes an epoxy group positioned at a side chain of the longer direction of a mesogen group and each of the mesogen group and the epoxy group is connected to the center of the molecular structure through a flexible linkage. Thus, the interaction between the mesogens in a cured resin product occurs significantly without weakening even after curing, thereby improving the heat conductivity of the resin compound through the active heat transfer between the mesogens.

In addition, the epoxy group may be bound under a mild condition in a short time to simplify the synthesis process. It is possible to minimize the ring-opening reaction in the epoxy group binding reaction system and to inhibit polymerization of the epoxy compound, thereby simplifying a purification process. Therefore, it is possible to obtain a liquid crystalline epoxy compound more efficiently.

Further, it is possible to ensure excellent moldability and liquid crystal temperature range and to improve the heat conductivity, thereby providing excellent heat radiation property.

DETAILED DESCRIPTION

Definition

Figure 1:
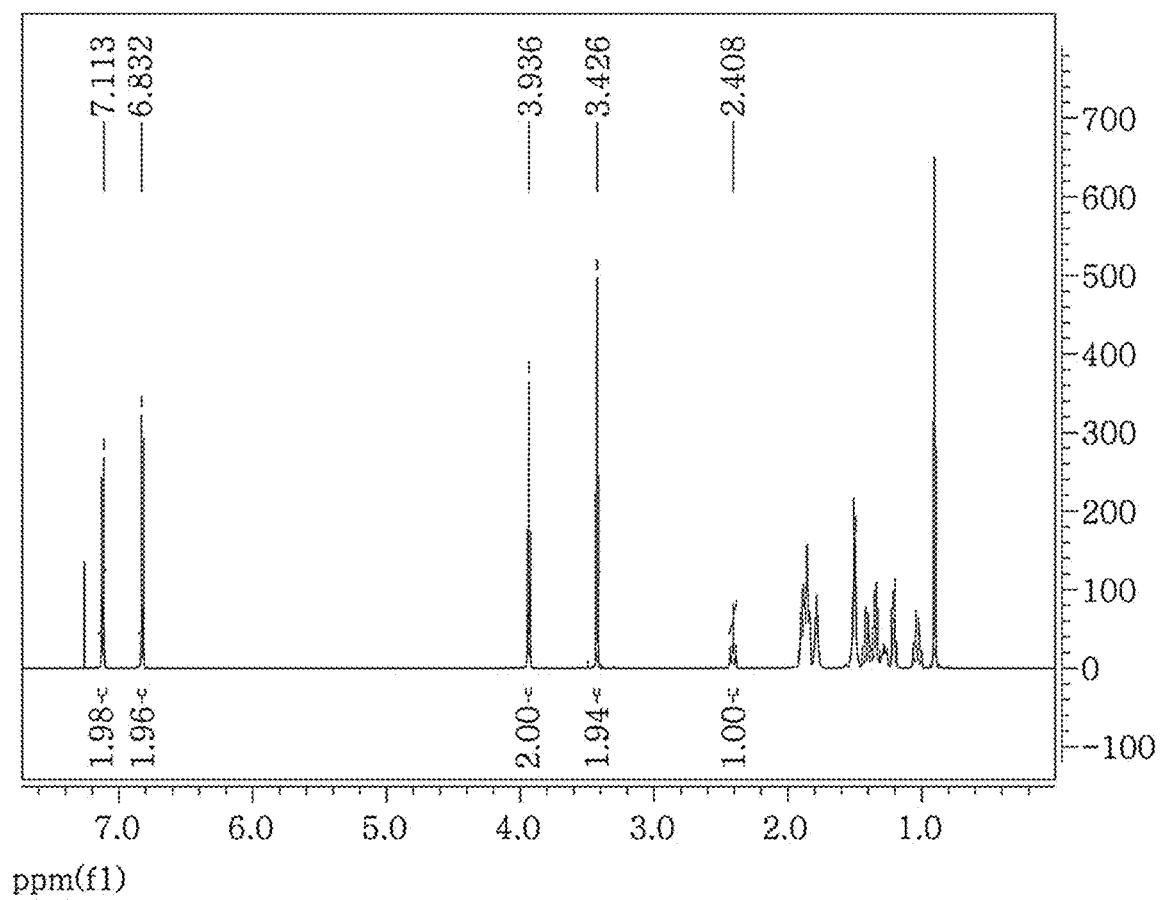
FIG. 1 shows a $^1$H NMR spectrum of PCH306Br obtained according to Example 1.

As used herein, 'flexible linkage' means a linkage capable of free rotation, such as a C—C bond. Such a flexible linkage allows an epoxy compound to maintain its crystallinity while improving the solubility, thereby improving the heat conductivity.

As used herein, 'mesogen group' means a functional group which shows liquid crystallinity in a compound.

As used herein, the expression 'epoxy group positioned at a side chain of the longer direction of the mesogen group in the structure of a liquid crystalline epoxy compound' means that the mesogen group and epoxy group each of which is connected to the center of the molecular structure through a flexible linkage are not present linearly but are present in a different direction.

Description of Exemplary Embodiments

Exemplary embodiments now will be described more fully hereinafter.

In one aspect, there is provided a liquid crystalline epoxy compound wherein an epoxy group is positioned at a side chain of the longer direction of a mesogen group and each of the mesogen group and the epoxy group is connected to the center of the molecular structure through a flexible linkage.

The epoxy group means —O— bound to two carbon atoms linked by a carbon chain. It may be represented by the following chemical formula, but is not limited thereto:

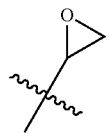

wherein

represents a site connected to another substituent.

According to an embodiment, the mesogen group may be represented by any one of the following chemical formula:

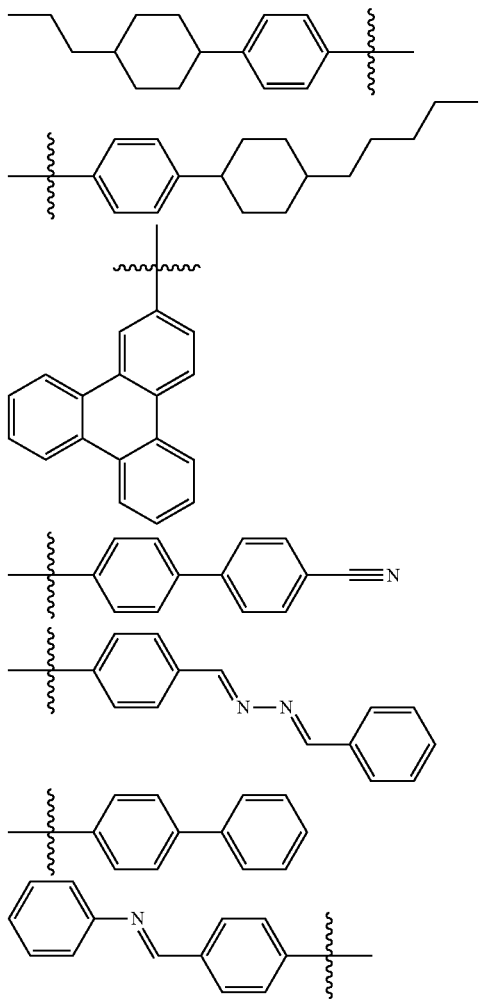

-continued

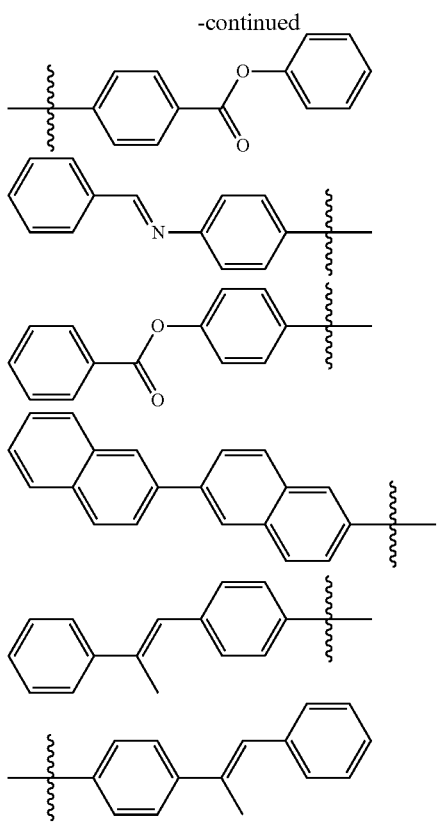

wherein

represents a site connected to another substituent.

According to another embodiment, the flexible linkage may be a divalent alkyl group [—(CH$_2$)$_m$—] or the divalent alkyl group substituted with O. More particularly, the flexible linkage may include —(CH$_2$)$_m$OCO— or —(CH$_2$)$_m$O—, and the mesogen group may be connected to the flexible linkage through O.

In addition, m represents an integer of 1 or more, such as 1-20. More particularly, m represents an integer of 2-12. When m is larger than 20, it is not possible to realize liquid crystallinity due to the folding of alkyl chains.

In an alkyl group, a C—C bond is capable of free rotation and has a spatial degree of freedom, unlike the other bonds. As a result, when the mesogen group is connected with the epoxy group through an alkyl group as a flexible linkage, it is possible to allow the mesogen group to realize liquid crystallinity separately from the epoxy group.

In the case of the conventional liquid crystalline epoxy compound, the epoxy group and mesogen group have a linear structure spatially. Thus, when a cured resin product is formed through the ring-opening of the epoxy group, the mesogen is also incorporated into the network structure. Therefore, due to the nature of the network structure forming a three-dimensional structure with ease, one- or two-dimensional structures including the mesogens may be weakened before curing.

In addition, the network structure of the mesogens is fixed after curing to provide an irregular molecular arrangement, resulting in low heat conductivity. When a filler is incorporated to increase heat conductivity, the other physical properties may be degraded.

Figure 12A:
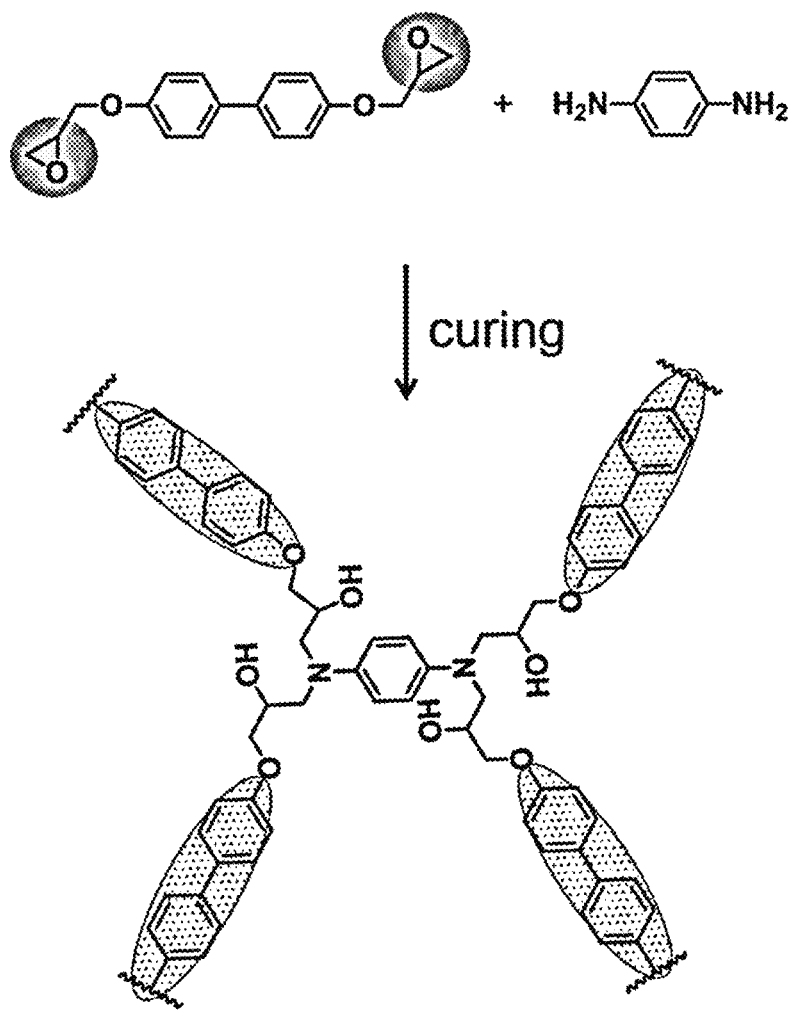
FIGS. 12A and 12B show curing in end type Epoxy and side type Epoxy.

In the case of the conventional liquid crystalline epoxy resin, its epoxy group is present at the end of the flexible linkage. Due to the dihedral angle of the bond, such as C—N or C—C, formed when curing occurs in the presence of a curing agent, even the mesogen groups are separated spatially, resulting in an irregular molecular arrangement. For this, heat-containing phonons cause scattering. As a result, the average free course of phonons is reduced, resulting in a decrease in heat conductivity (see, FIG. 12A).

Figure 12B:
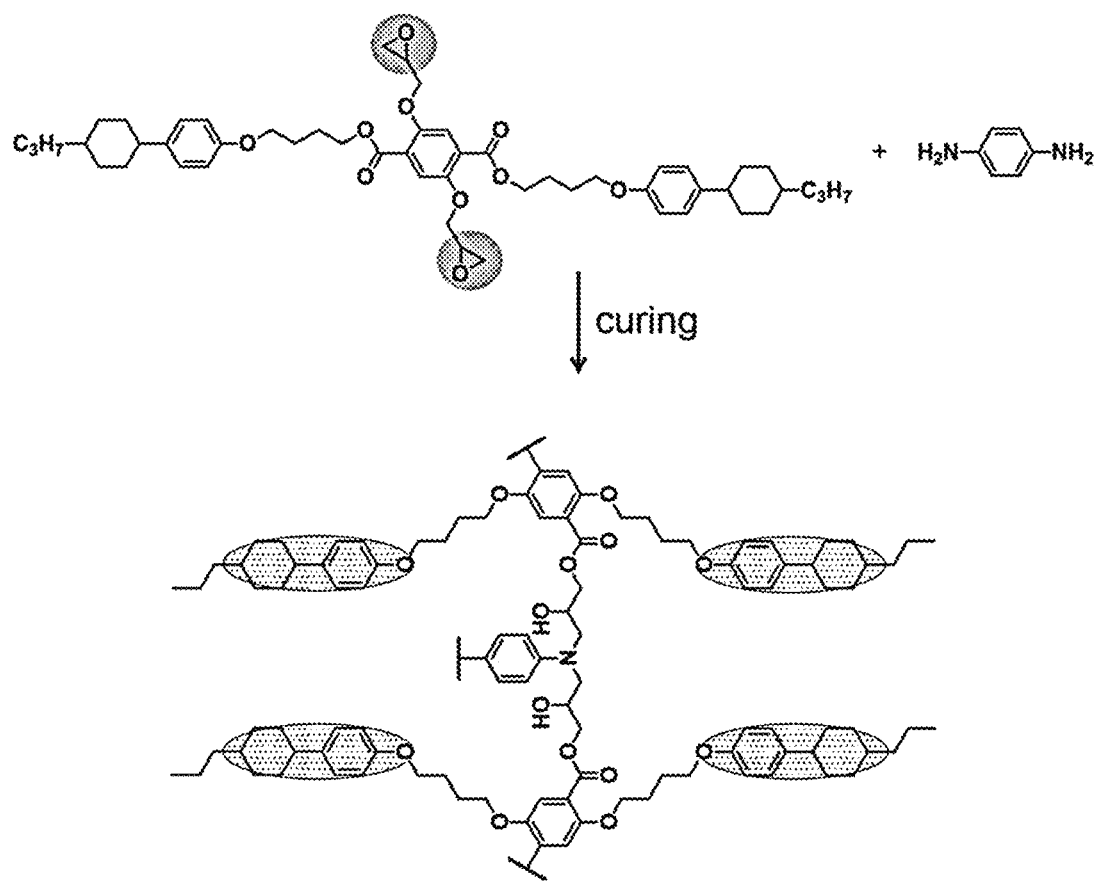

However, in the case of the liquid crystalline epoxy compound disclosed herein, its epoxy group is present at a side chain of the longer direction of the mesogen. Since a flexible linkage is interposed in the molecular structure, the mesogen group can maintain regular orientation regardless of the dihedral angle of the C—N bond formed after curing. This is because the free rotation of the flexible linkage offsets the three dimensional stress generated by the dihedral angle of the C—N bond, and thus it is not possible to break the regularly oriented structure caused by the Van der Waals force of the mesogen group. As a result, phonons transferring heat may be delivered to a region with high crystallinity without scattering even after curing, and the free course of phonons is not reduced, thereby providing high heat conductivity (see, FIG. 12B).

The liquid crystalline epoxy compound disclosed herein has an epoxy group positioned at a side chain of the longer direction of the mesogen group, and each of the mesogen group and the epoxy group is connected to the center of the molecular structure through a flexible linkage.

Thus, the epoxy group is not positioned at the end of the mesogen group but is positioned at a side chain of the longer direction of the mesogen group or in a different direction from the longer direction of the mesogen group, and the mesogen group is connected to the center of the molecular structure through a flexible linkage. Thus, it is possible to prevent the above-mentioned problem of incorporation of the mesogen group into a network structure upon curing.

In addition, since the epoxy group and the mesogen group are not present in a linear structure but are present in a different direction and the epoxy group is present particularly at a side chain of the longer direction of the mesogen group, the interaction at the mesogen site may not be weakened even after curing, thereby providing a highly aligned structure. Therefore, it is possible to increase crystallinity and to improve heat conductivity.

Additionally, such a highly aligned structure realizes liquid crystallinity in a significantly broad range through the mixing of the synthesized substances. Thus, it is possible to provide high heat conductivity despite a low amount of filler.

Further, it is possible to provide a liquid crystalline epoxy compound having excellent moldability and capable of controlling a temperature where liquid crystals are realized through the introduction of a flexible linkage (such as L, L1 and L2 in the following Chemical Formula 1 to 3).

According to still another embodiment, the liquid crystalline epoxy compound may be represented by any one of the following Chemical Formula 1 to 3:

[Chemical Formula 1]

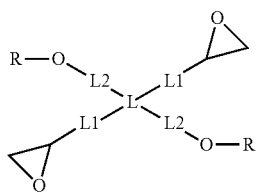

[Chemical Formula 1-1]

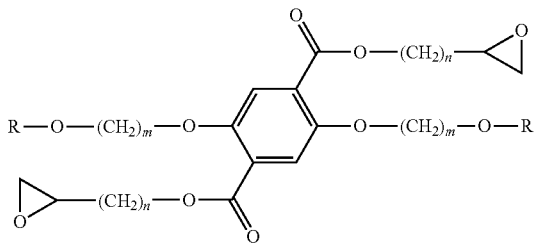

[Chemical Formula 2]

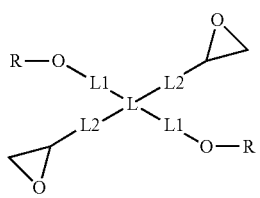

[Chemical Formula 2-1]

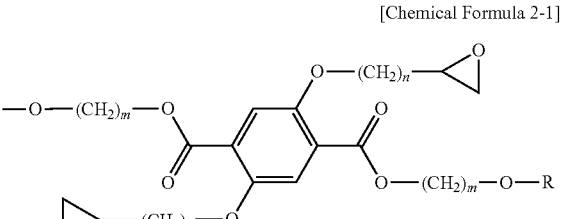

[Chemical Formula 3]

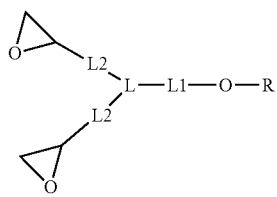

[Chemical Formula 3-1]

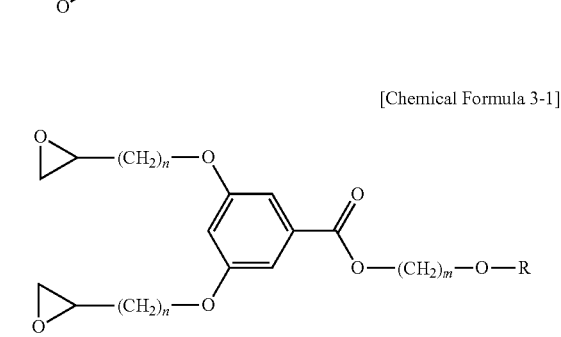

In Chemical Formula 1 to 3, L is a central aromatic hydrocarbon substituted with L1 and L2, wherein L1 is a flexible linkage represented by —$(CH_2)_m OCO$—, L2 is a flexible linkage represented by —$(CH_2)_m O$—, and R represents a mesogen group. m represents an integer of 1 or more.

According to still another embodiment, the central aromatic hydrocarbon may be a monocyclic or multicyclic hydrocarbon and its carbon number is not particularly limited but may be 6-60.

According to still another embodiment, the carbon number m of the flexible group represented by —$(CH_2)_m OCO$— or —$(CH_2)_m O$— is the same as defined above.

According to still another embodiment, the mesogen group is the same as defined above.

According to still another embodiment, the liquid crystalline epoxy compound may be represented particularly by any one of the following Chemical Formula 1-1, 2-1 and 3-1:

In Chemical Formula 1-1, 2-1 and 3-1, R represents a mesogen group, each of m and n represents an integer of 1 or more, m is the same as defined above, n may be 1-20, more particularly 2-12. When n is larger than 20, it is not possible to realize liquid crystallinity due to the folding of alkyl chains.

According to still another embodiment, the mesogen group is the same as defined above.

According to still another embodiment, Chemical Formula 1-1 may be represented by the following Chemical Formula 20:

[Chemical Formula 20]

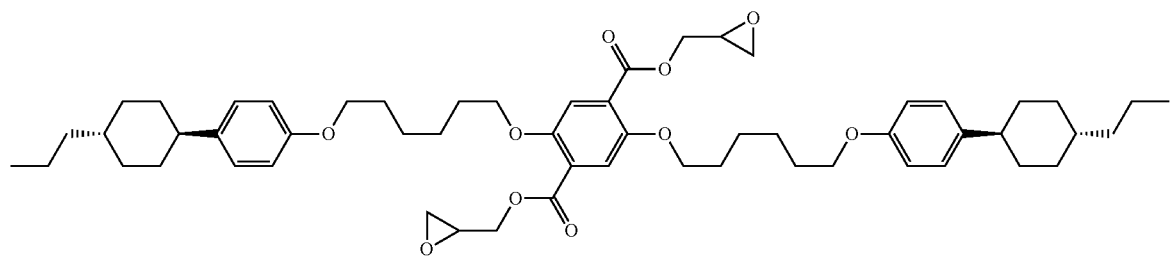

According to still another embodiment, Chemical Formula 2-1 may be represented by the following Chemical Formula 25:

[Chemical Formula 25]

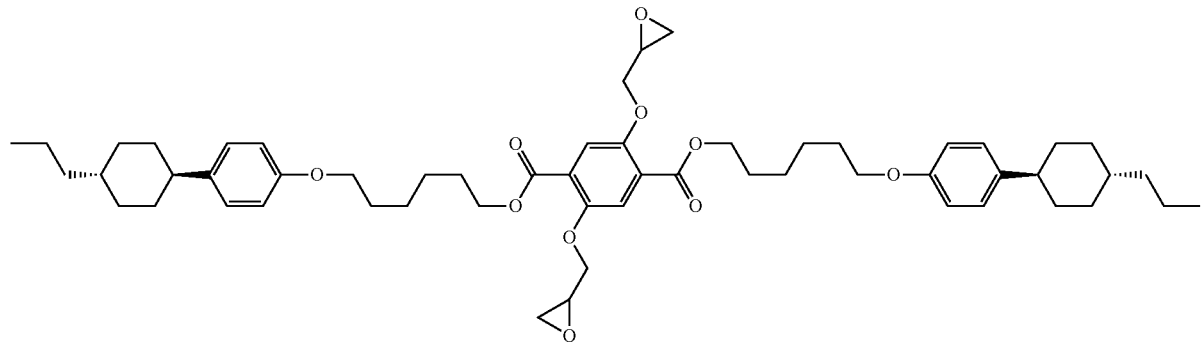

According to still another embodiment, Chemical Formula 3-1 may be represented by the following Chemical Formula 29:

[Chemical Formula 29]

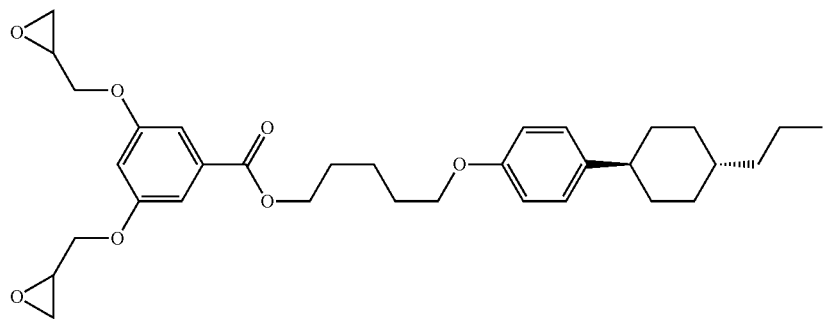

Hereinafter, the method for preparing a liquid crystalline epoxy compound will be explained with reference to some exemplary embodiments.

According to an embodiment, the method for preparing a liquid crystalline epoxy compound includes: 1) preparing a liquid crystalline alkyl halide compound having a mesogen group; 2) preparing a liquid crystalline ester derivative from the liquid crystalline alkyl halide compound; 3) preparing a liquid crystalline carboxylic acid derivative from the liquid crystalline ester derivative; and 4) preparing a liquid crystalline epoxy compound represented by Chemical Formula 1-1 from the liquid crystalline carboxylic acid derivative.

According to still another embodiment, the method for preparing a liquid crystalline compound includes: (A) preparing a liquid crystalline alkyl halide compound represented by the following Chemical Formula 4 from a liquid crystalline alcohol compound and an alkyl halide; (B) preparing a liquid crystalline ester derivative represented by the following Chemical Formula 5 from the compound represented by the following Chemical Formula 4 and a dialkyl 2,5-dihydroxyterephthalate; (C) preparing a liquid crystalline carboxylic acid derivative represented by the following Chemical Formula 6 from the compound represented by the following Chemical Formula 5; and (D) preparing a liquid crystalline epoxy compound from the compound represented by the following Chemical Formula 6 and 1,2-epoxy-(n+2)-alkyl alcohol:

[Chemical Formula 4]

$R-O-(CH_2)_m-X$

[Chemical Formula 5]

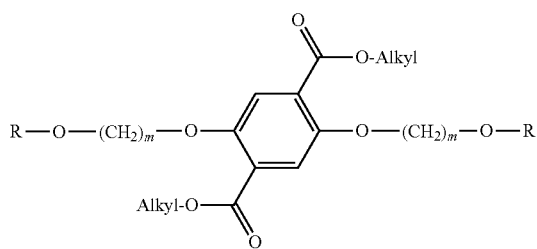

[Chemical Formula 6]

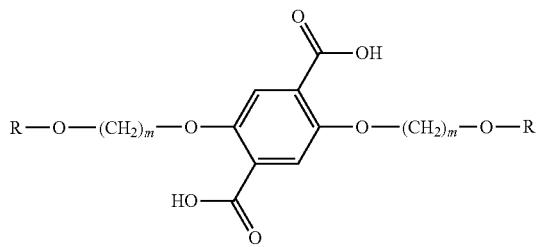

In Chemical Formula 4 to 6, R and m are the same defined above, X represents a halogen group, and Alkyl represents a C1 or higher alkyl group.

According to still another embodiment, the halogen group may be fluorine (F), chlorine (Cl), bromine (Br) or iodine (I), and pseudo-halogen groups may include triflate (—OSO$_2$CF$_3$), tosylate (—OSO$_2$C$_6$H$_4$CH$_3$), or the like.

According to still another embodiment, the alkyl group is the same as defined above.

According to still another embodiment, the liquid crystalline alcohol compound used in step (A) is a compound whose mesogen group is substituted with a hydroxyl group at the end thereof, and the compound may be at least one selected from the group consisting of 4-(trans-4-n-propylcyclohexyl)phenol, 4-(trans-4-n-pentylcyclohexyl)phenol, 4'-hydroxy-4-biphenylcarbonitrile, 4-phenylphenol, 4-[(phenylimino)methyl]phenol, 4-(benzylideneamino)phenol, 2-triphenylenol, benzylidene-(4-hydroxy-benzylidene)-hydrazine, phenyl 4-hydroxybenzoate, 4-(phenylcarbonyloxy)phenol, 6-(2-naphthyl)-2-naphthol, (E)-1-(4-hydroxyphenyl)-2-phenylpropene and (E)-1-phenyl-2-(p-hydroxyphenyl)-propene.

According to still another embodiment, the alkyl halide used in step (A) may be a linear hydrocarbon compound whose ends are substituted with two halogen atoms or pseudo-halogen groups as depicted in the following Chemical Formula 7:

 [Chemical Formula 7]

X—(CH$_2$)$_m$—X wherein X and m are the same as defined above.

In step (A), the liquid crystalline alcohol compound, alkyl halide, basic substance and a catalyst are allowed to react in a solvent. The basic substance used herein may be at least one selected from the group consisting of lithium (Li), sodium (Na), potassium (K), lithium carbonate (Li$_2$CO$_3$), sodium carbonate (Na$_2$CO$_3$), potassium carbonate (K$_2$CO$_3$), cesium carbonate (Cs$_2$CO$_3$), lithium hydroxide (LiOH), sodium hydroxide (NaOH), potassium hydroxide (KOH), cesium hydroxide (CsOH), lithium methoxide (LiOMe), sodium methoxide (NaOMe), potassium methoxide (KOMe), cesium methoxide (CsOMe), Lithium ethoxide (LiOEt), sodium ethoxide (NaOEt), potassium ethoxide (KOEt), cesium ethoxide (CsOEt), lithium oxide (Li$_2$O), sodium oxide (Na$_2$O), potassium oxide (K$_2$O), cesium oxide (Cs$_2$O), lithium hydride (LiH), sodium hydride (NaH), potassium hydride (KH), cesium hydride (CsH), lithium phosphate (Li$_3$PO$_4$), sodium phosphate (Na$_3$PO$_4$), potassium phosphate (K$_3$PO$_4$), cesium phosphate (Cs$_3$PO$_4$), imidazole, trimethylamine and pyridine.

In addition, the catalyst used herein may be at least one selected from the group consisting of tetraalkyl fluoride, tetraalkylammonium chloride, tetraalkylammonium bromide, tetrabutylammonium iodide, 18-crown-6, lithium fluoride (LiF), lithium chloride (LiCl), lithium bromide (LiBr), lithium iodide (LiI), sodium bromide (NaF), sodium chloride (NaCl), sodium bromide (NaBr), sodium iodide (NaI), potassium fluoride (KF), potassium chloride (KCl), potassium bromide (KBr), potassium iodide (KI), cesium fluoride (CsF), cesium chloride (CsCl), cesium bromide (CsBr) and cesium iodide (CsI).

Further, the solvent used herein may be at least one selected from the group consisting of water, acetone, N,N-dimethylformamide, N,N-dimethylacetamide, N-methylpyrrolidone, dimethylsulfoxide, tetrahydrofuran, ethyl acetate, acetonitrile, nitromethane, methyl ethyl ketone, diethyl ketone and 1,4-dioxane.

According to still another embodiment, the alkyl group of the dialkyl 2,5-dihydroxyterephthalate used in step (B) may be at least one selected from C1-C20 alkyl groups. In addition, in step (B), the liquid crystalline alkyl halide represented by the above Chemical Formula 4, dialkyl 2,5-dihydroxyterephthalate, a basic substance similar to the basic substance used in step (A), a catalyst and a solvent are used to carry out reaction.

In step (C), the liquid crystalline ester derivative represented by Chemical Formula 5 and a basic substance similar to the basic substance used in step (A) are allowed to react in a solvent. The solvent used herein may be at least one selected from the group consisting of water, methanol, ethanol, isopropanol, n-butanol, ethylene glycol, tetrahydrofuran, acetone, N,N-dimethylformamide, N,N-dimethylacetamide, N-methylpyrrolidone, dimethylsulfoxide, acetonitrile, methyl ethyl ketone, diethyl ketone and 1,4-dioxane.

In step (D), the liquid crystalline carboxylic acid derivative represented by the above Chemical Formula 6, 1,2-epoxy-(n+2)-alkyl alcohol and a dehydrating agent are allowed to react in a solvent. The dehydrating agent used herein may be at least one selected from the group consisting of N,N'-dicyclohexylcarbodiimide, N,N'-diisopropylcarbodiimide, 1-ethyl-3-(3-dimethylaminopropyl)carbodiimide, N-hydroxysuccinimide, 4-dimethylaminopyridine, N-hydroxybenzotriazole, 1-hydroxy-7-azabenzotriazole, 2-(1H-benzotriazol-1-yl)-1,1,3,3,-tetramethyluronium hexafluorophosphate, 1-(bis(dimethylamino)methylene)-1H-1,2,3-triazolo[4,5-b]pyridinium 3-oxid hexafluorophosphate, benzotriazol-1-yl-oxytripyrrolidinophosphonium hexafluorophosphate, 3-(diethoxyphosphoryloxy)-1,2,3-benzotriazin-4(3H)-one, thionyl chloride and pyridine.

In addition, the solvent used herein may be at least one selected from the group consisting of diethyl ether, chloroform, 1,4-dioxane, dichloromethane, ethyl acetate, tetrahydrofuran, acetone, acetonitrile, N,N-dimethylformamide, N,N-dimethylacetamide, N-methylpyrrolidone, dimethylsulfoxide, acetonitrile, methyl ethyl ketone and diethyl ketone.

According to still another embodiment, the method for preparing a liquid crystalline epoxy compound includes: 1) preparing a liquid crystalline alcohol derivative having a mesogen group; 2) preparing a carboxylic acid derivative whose hydroxyl group is protected; 3) preparing a liquid crystalline ester derivative from the liquid crystalline alcohol derivative and the carboxylic acid derivative whose hydroxyl group is protected; 4) preparing a liquid crystalline ester derivative whose hydroxyl group is deprotected from the liquid crystalline ester derivative; and 5) preparing a liquid crystalline epoxy compound represented by the above Chemical Formula 2-1 or 3-1 from the liquid crystalline ester derivative whose hydroxyl group is deprotected.

According to still another embodiment, the method for preparing a liquid crystalline epoxy compound may include: (E) preparing a liquid crystalline alcohol derivative represented by the following Chemical Formula 8 from a liquid crystalline alcohol compound similar to the liquid crystalline alcohol compound used in step (A) and 1-haloalkyl alcohol; (F) protecting the hydroxyl group of 2,5-dihydroxyterephthalic acid to obtain a carboxylic acid derivative represented by the following Chemical Formula 9; (G) preparing a liquid crystalline ester derivative represented by the following Chemical Formula 10 from the compound represented by the following Chemical Formula 8 and the compound represented by the following Chemical Formula 9; (H) deprotecting the hydroxyl group of the compound represented by the following Chemical Formula 10 to obtain a liquid crystalline ester derivative represented by the following Chemical Formula 11; and (I) preparing a liquid crystalline epoxy compound represented by Chemical Formula 2-1 from the compound represented by the following Chemical Formula 11 with 1-halo-(n+1, n+2)-epoxyalkane:

[Chemical Formula 8]

R—O—(CH$_2$)$_m$—OH

[Chemical Formula 9]

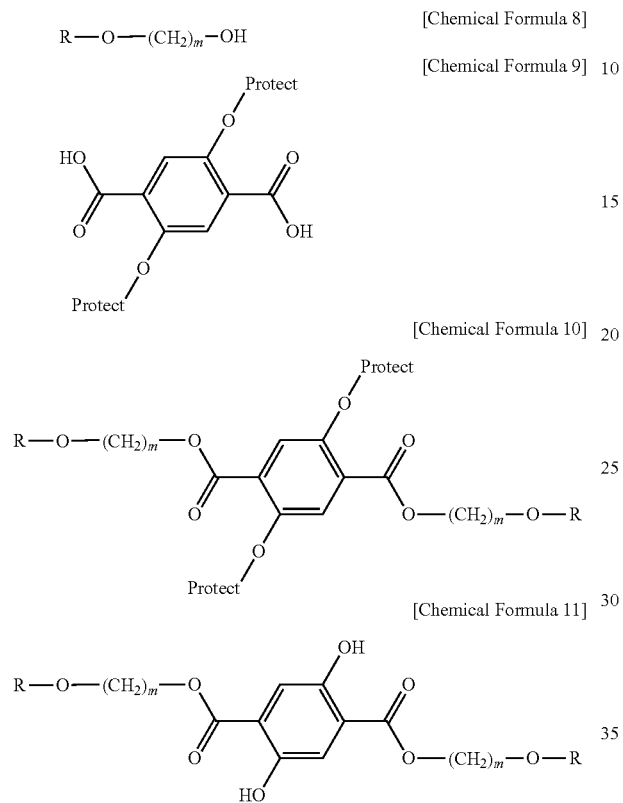

[Chemical Formula 10]

[Chemical Formula 11]

In Chemical Formula 8 to 11, R and m are the same as defined above, and Protect represents any one selected from the group consisting of acetyl, benzoyl, benzyl, methoxyethoxymethyl, dimethoxytrityl, methoxymethyl, methoxytrityl, methoxybenzyl, pivaloyl, tetrahydropyranyl (THP), tetrahydrofuryl (THF), trityl, trimethylsilyl (TMS), tert-butyldimethylsilyl (TBDMS), triisopropylsilyl, triisopropylsilyloxymethyl and ethoxyethyl.

According to still another embodiment, 1-haloalkyl alcohol used in step (E) may be a linear hydrocarbon compound, one end of which is substituted with a halogen atom or pseudo-halogen functional group similarly to Chemical Formula 7 and the other end of which is substituted with a hydroxyl group, as depicted in the following Chemical Formula 12:

X—(CH$_2$)$_m$—OH      [Chemical Formula 12]

wherein X and m are the same as defined above.

In step (E), a liquid crystalline epoxy alcohol compound similar to the liquid crystalline epoxy alcohol compound used in step (A), 1-haloalkyl alcohol, a basic substance similar to the basic substance used in step (A), a catalyst and a solvent are used to carry out reaction.

In step (F), a basic substance similar to the basic substance used in step (A) is used to substitute the hydroxyl group of 2,5-dihydroxyterephthalic acid with a protecting group.

According to still another embodiment, the protecting group may be any one selected from the group consisting of acetyl, benzoyl, benzyl, methoxyethoxymethyl, dimethoxytrityl, methoxymethyl, methoxytrityl, methoxybenzyl, pivaloyl, tetrahydropyranyl (THP), tetrahydrofuryl (THF), trityl, trimethylsilyl (TMS), tert-butyldimethylsilyl (TBDMS), triisopropylsilyl, triisopropylsilyloxymethyl and ethoxyethyl.

In step (G), the liquid crystalline alcohol derivative represented by Chemical Formula 8, carboxylic acid derivative represented by Chemical Formula 9, a dehydrating agent similar to the dehydrating agent used in step (D) and a solvent are used to carry out reaction.

In step (H), a deprotection method suitable for the protecting group used in step (F) is used. For example, when a trimethylsilyl group is used as a protecting group, a deprotection method that may be used includes allowing tetrabutylammonium fluoride to react with a liquid crystalline ester derivative represented by the above Chemical Formula 10 in a tetrahydrofuran solvent.

According to still another embodiment, 1-halo-(n+1, n+2)-epoxyalkane used in step (I) may be a linear hydrocarbon compound, one end of which is substituted with a halogen atom or a pseudo-halogen functional group similarly to Chemical Formula 7 and the other end of which is substituted with an epoxy group, as depicted in the following Chemical Formula 13:

[Chemical Formula 13]

wherein X and n are the same as defined above.

In step (I), the liquid crystalline ester derivative represented by the above Chemical Formula 11, 1-halo-(n+1, n+2)-epoxyalkane represented by the above Chemical Formula 13, a basic substance similar to the basic substance used in step (A) and a catalyst are used to carry out reaction. Herein, no solvent may be used or a solvent similar to the solvent used in step (A) may be used.

According to still another embodiment, the method for preparing a liquid crystalline epoxy compound may include: (J) preparing a liquid crystalline alcohol derivative represented by the above Chemical Formula 8 from a liquid crystalline alcohol compound and 1-haloalkyl alcohol represented by the above Chemical Formula 12; (K) protecting the hydroxyl group of 3,5-dihydroxybenzoic acid to obtain a carboxylic acid derivative represented by the following Chemical Formula 14; (L) preparing a liquid crystalline ester derivative represented by the following Chemical Formula 15 from the compound represented by the above Chemical Formula 8 and the compound represented by the following Chemical Formula 14; (M) deprotecting the hydroxyl group of the compound represented by the following Chemical Formula 15 to obtain a liquid crystalline ester derivative represented by the following Chemical Formula 16; and (N) preparing a liquid crystalline epoxy compound from the compound represented by the following Chemical Formula 16 and 1-halo-(n+1, n+2)-epoxyalkane represented by the above Chemical Formula 13:

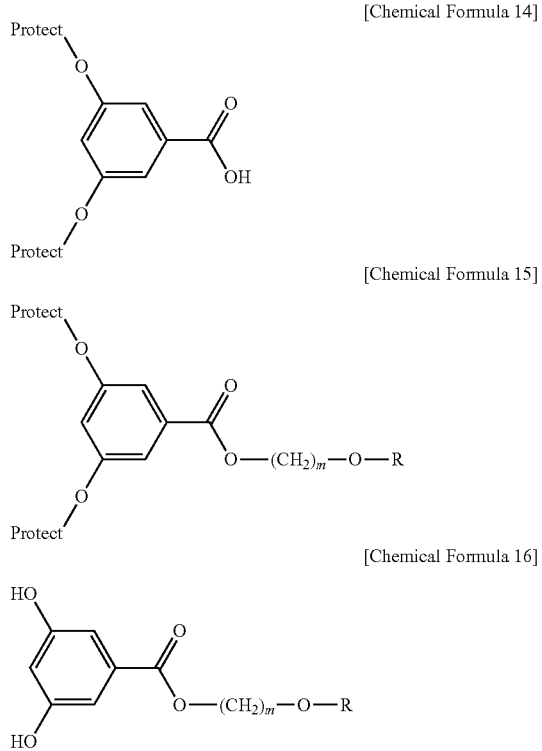

In step (J), the liquid crystalline alcohol, 1-haloalkyl alcohol represented by the above Chemical Formula 12, a basic substance similar to the basic substance used in step (A), a catalyst and a solvent are used to carry out reaction.

In step (K), a basic substance similar to the basic substance used in step (A) is used to substitute the hydroxyl group of 2,5-dihydroxyterephthalic acid with a protecting group. The protecting group used herein may be similar to the protecting group used in step (F).

In step (L), the liquid crystalline alcohol derivative represented by the above Chemical Formula 8, carboxylic acid derivative represented by the above Chemical Formula 14, a dehydrating agent similar to the dehydrating agent used in step (D) and a solvent are used to carry out reaction.

In step (M), similarly to step (H), a deprotection method suitable for the protecting group used in step (K) is used. For example, when a teterhydropyranyl group is used as a protecting group, the deprotection method that may be used includes allowing the liquid crystalline ester derivative to react with acetic acid in a mixed solvent of tetrahydrofuran with water.

In step (N), the liquid crystalline ester derivative represented by the above Chemical Formula 16, 1-halo-(n+1,n+2)-epoxyalkane represented by the above Chemical Formula 13, a basic substance similar to the basic substance used in step (A) and a catalyst are used to carry out reaction. Herein, no solvent is used or a solvent similar to the solvent used in step (A) may be used.

In still another aspect, there is provided a method for forming a cured epoxy resin product by reacting the liquid crystalline epoxy compound with a curing agent, and a cured product of liquid crystalline epoxy resin obtained by reacting the liquid crystalline epoxy compound with a curing agent.

According to an embodiment, the curing agent may be an amine- or acid anhydride-based curing agent. The amine-based curing agent used herein may be at least one selected from the group consisting of diaminodiphenylmethane, p-phenylenediamine, m-phenylenediamine, o-phenylenediamine, diaminodiphenylsulfone, sulfanilamide, naphthalenediamine, tetramethylenediamine, hexamethylenediamine, octamethylenediamine, 2,3-dichlorobenzene-1,4-diamine, 2,5-dichlorobenzene-1,4-diamine, 2,6-dichlorobenzene-1,4-diamine, diethylenetetramine, triethylenetetramine and tetraethylenepentamine. In addition, the acid anhydride-based curing agent used herein may be at least one selected from the group consisting of phthalic anhydride, tetrahydrophthalic anhydride, methyltetrahydrophthalic anhydride, hexahydrophthalic anhydride and methyl nadic anhydride.

In addition, the amount of the curing agent used herein is determined by the number of functional groups of the curing agent. For example, when using p-phenylenediamine as a curing agent, the mol number of the curing agent corresponds to 50% of the mol number of the liquid crystalline epoxy compound.

According to another embodiment, an additional curing catalyst may be used, besides the curing agent. For example, such a catalyst may be at least one selected from the group consisting of 2-methylimidazole and 2-ethyl-4-methylimidazole, and may be used particularly in an amount of 0.05-5 wt % based on the weight of the liquid crystalline epoxy compound.

According to still another embodiment, the cured product of liquid crystalline epoxy resin may further include a heat conductive filler.

Particularly, the cured product of liquid crystalline epoxy resin may be obtained by mixing the liquid crystalline epoxy compound with a heat conductive filler and then carrying out reaction with a curing agent. The heat conductive filler means a filler material forming the ingredients of the cured product of liquid crystalline epoxy resin, and may be at least one selected from the group consisting of aluminum oxide, aluminum nitride, boron nitride, silicon nitride, carbon nanotubes, graphene, diamond and copper particles.

Hereinafter, the present disclosure will be described with respect to the specific embodiments. However, the following examples are not intended to limit the scope of the present disclosure and various changes and modifications may be made without departing from the spirit and scope of the disclosure as defined in the following claims. It will be apparent that these exemplary embodiments are provided so that the present disclosure will be complete and understood easily by those skilled in the art.

Experiment 1—Synthesis of Liquid Crystalline Epoxy Compound Represented by Chemical Formula 1

In Examples 1 to 4, four steps of (A), (B), (C) and (D) for preparing a liquid crystalline epoxy compound represented by Chemical Formula 1 are described, wherein (4-(trans-4-n-propylcyclohexyl)phenoxy) group is used as a mesogen group, 1,6-dibromohexane (n=6) is used as an alkyl halide, diethyl 2,6-dihydroxyterephthalate is used as a dialkyl 2,5-dihydroxyterephthalate, and glycidol (n=1) is used as a 1,2-epoxy-(n+2)-alkyl alcohol. The compounds produced from each of the steps are designated as PCH306Br, DEP306, DCP306 and DGP306.

In the case of NMR analysis, Solution state NMR 600 MHz Spectrometer available from Agilent Co. is used with chloroform-d as a solvent. EI-MS is used for mass spectrometry, wherein the molecular weight of positive ion is determined.

Example 1: Synthesis of Liquid Crystalline Alkyl Halide (PCH306Br)

The liquid crystalline alcohol compound used in Example 1 is 4-(trans-4-n-propylcyclohexyl)phenol and the alkyl halide is 1,6-dibromohexane (n=6, X=Br). First, 8.3 g (0.06 mol) of potassium carbonate (available from Daejung Chemicals & Metals Co., Ltd.) and 0.8 g (0.003 mol) of 18-crown-6 (1,4,7,10,13,16-hexaoxacyclooctadecane) are introduced to a 500 mL 2-necked round bottom flask and the internal air is substituted with argon gas. Next, 14.6 g (0.06 mol) of 1,6-dibromohexane (available from TCI) and 30 mL of acetone (available from Daejung Chemicals & Metals Co., Ltd.) are introduced, and then a solution of 4-(trans-4-n-propylcyclohexyl)phenol (available from Kanto Chemical) dissolved in 200 mL of acetone is introduced gradually thereto through a dropping funnel and reaction is carried out at 55° C. for 3 days. After the completion of the reaction, insoluble salt, potassium bromide is removed through filtering. Then, the acetone solution is concentrated to about 50 mL by using a rotary evaporator (available from EYELA) and introduced gradually to 1 L of methanol acetone (available from Daejung Chemicals & Metals Co., Ltd.) to cause precipitation. After that, the precipitate is recovered through filtering and dried in a vacuum oven. As a result, 13.3 g (0.035 mol) of PCH306Br (1-(1-bromohexoxy)-4-(trans-4-n-propylcyclohexyl)benzene, Chemical Formula 17) is obtained in the form of white powder.

[Chemical Formula 17]

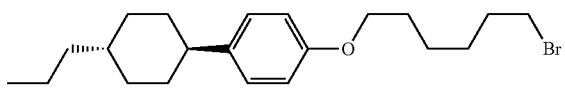

Figure 2:
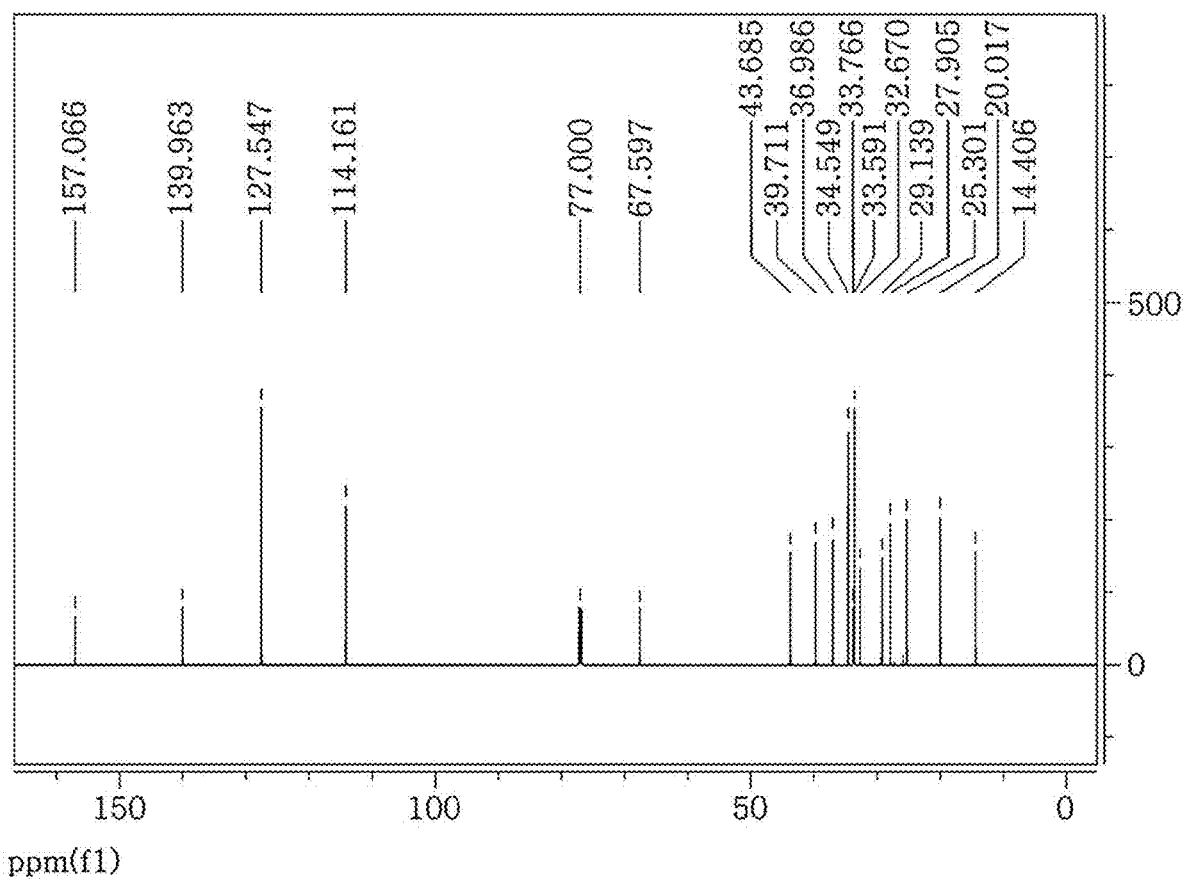
FIG. 2 shows a $^{13}$C NMR spectrum of PCH306Br obtained according to Example 1.

FIG. 1 shows a $^1$H NMR spectrum of PCH306Br obtained according to Example 1, and FIG. 2 shows a $^{13}$C NMR spectrum of PCH306Br obtained according to Example 1.

Example 2: Synthesis of Liquid Crystalline Ester Compound (DEP306)

The alkyl halide used in Example 2 is PCH306Br obtained from Example 1 and dialkyl 2,5-dihydroxyterephthalate is diethyl 2,5-dihydroxyterephthalate. First, 13.3 g (0.035 mol) of PCH306Br, 4.6 g (0.018 mol) of diethyl 2,5-dihydroxyterephthalate (available from Sigma-Aldrich), 2.5 g (0.018 mol) of potassium carbonate (available from Daejung Chemicals & Metals Co., Ltd.) and 0.5 g (0.002 mol) of 18-crown-6 (1,4,7,10,13,16-hexaoxacyclooctadecane, available from Daejung Chemicals & Metals Co., Ltd.) are introduced to a 500 mL 2-necked round bottom flask, and the internal air is substituted with argon gas. Next, 170 mL of N,N-dimethylformamide (DMF, anhydrous, available from Sigma-Aldrich) is introduced thereto and reaction is carried out at 110° C. for 3 days. After the completion of the reaction, DMF in the solution is removed by using a rotary evaporator (available from EYELA), extracted with 500 mL of dichloromethane (available from Daejung Chemicals & Metals Co., Ltd.), washed with 300 mL of water and 300 mL of aqueous saturated saline, and then dried over sodium sulfate (available from Daejung Chemicals & Metals Co., Ltd.). The resultant organic layer solution is subjected to chromatography on silica gel using dichloromethane as an eluent and dried in a vacuum oven. As a result, 14.5 g (0.017 mol) of DEP306 (diethyl 2,5-di(1-(4-(trans-4-n-propylcyclohexyl)phenoxy)hexoxy) terephthalate, Chemical Formula 18) is obtained in the form of white powder.

[Chemical Formula 18]

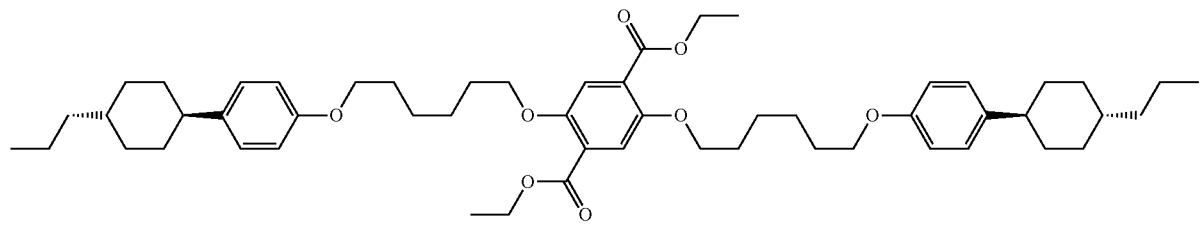

Figure 3:
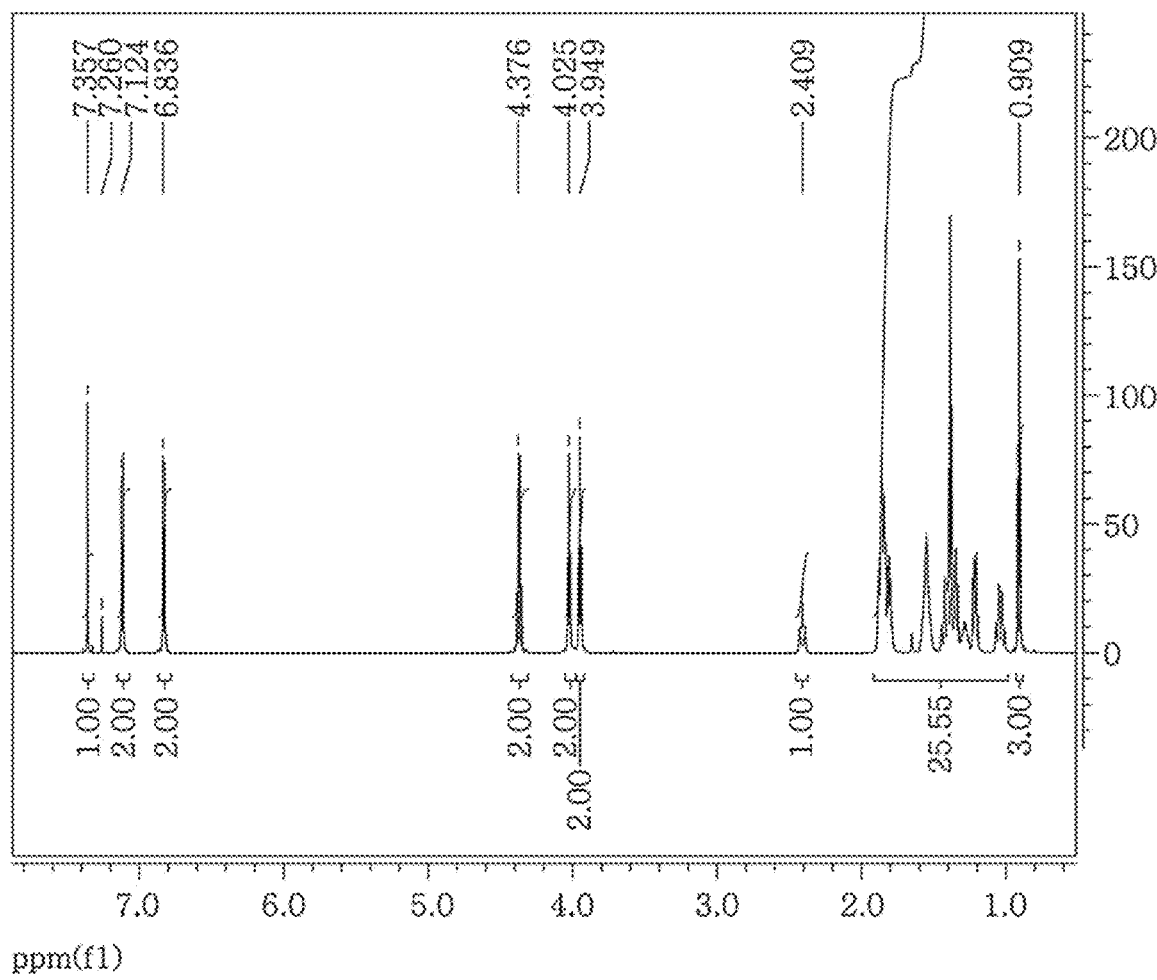
FIG. 3 shows a $^1$H NMR spectrum of DEP306 obtained according to Example 2.
Figure 4:
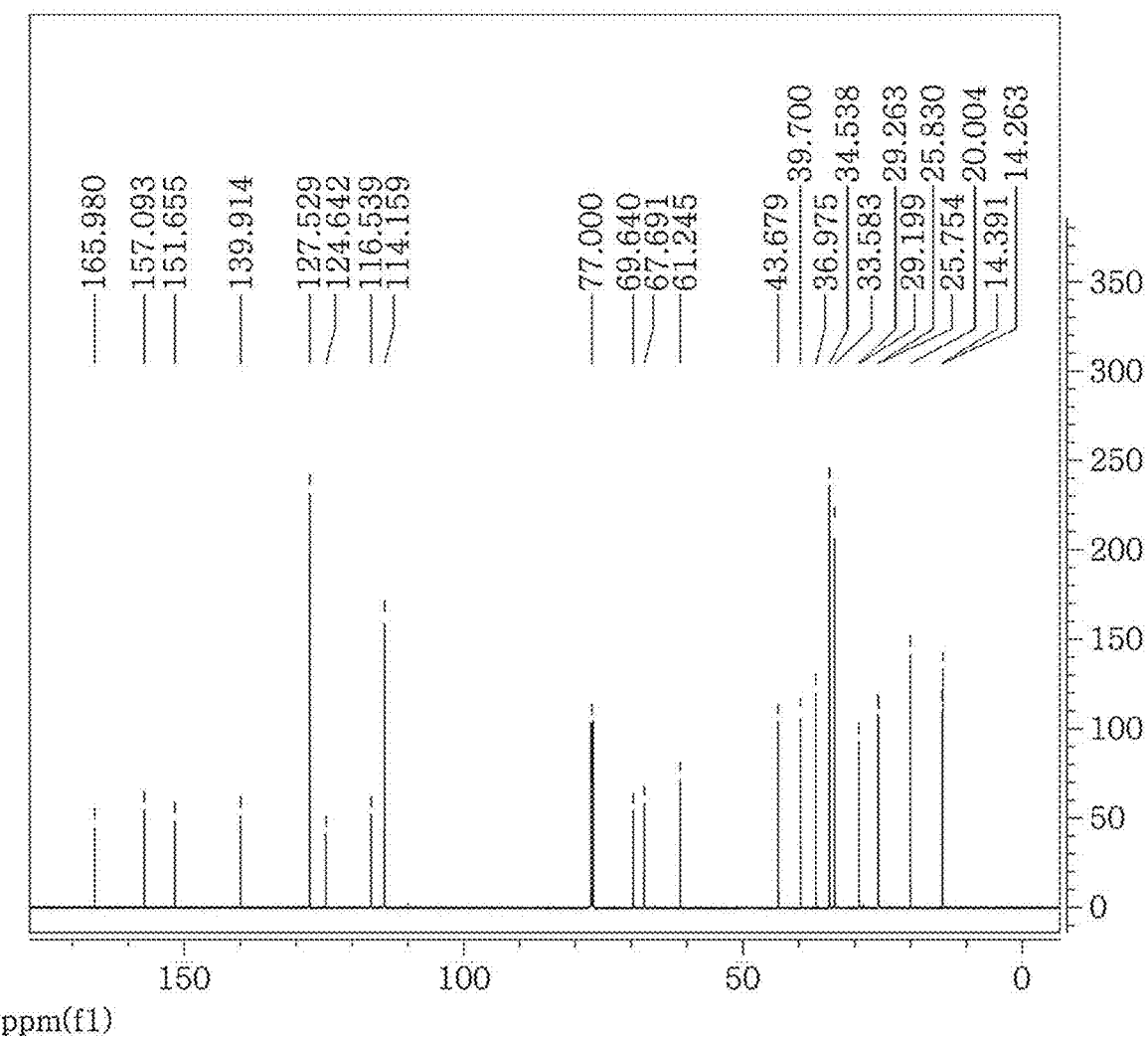
FIG. 4 shows a $^{13}$C NMR spectrum of DEP306 obtained according to Example 2.

FIG. 3 shows a $^1$H NMR spectrum of DEP306 obtained according to Example 2, and FIG. 4 shows a $^{13}$C NMR spectrum of DEP306 obtained according to Example 2.

Example 3: Synthesis of Liquid Crystalline Carboxylic Acid Derivative (DCP306)

The liquid crystalline ester compound used in Example 3 is DEP306 obtained from Example 2. First, 14.5 g (0.017 mol) of DEP306 and 53.1 g (0.95 mol) of potassium hydroxide (available from Daejung Chemicals & Metals Co., Ltd.) are introduced to a 500 mL 1-necked round bottom flask, and 40 mL of ethanol (available from Daejung Chemicals & Metals Co., Ltd.), 20 mL of tetrahydrofuran (THF) (available from Daejung Chemicals & Metals Co., Ltd.) and 80 mL of distilled water are introduced thereto and reaction is carried out at 80° C. for 3 days. After the completion of the reaction, the reaction mixture is cooled to 0° C. and the solution is acidified to about pH 2 by using hydrochloric acid (35% aqueous HCl solution, available from Daejung Chemicals & Metals Co., Ltd.) to cause precipitation in the reaction mixture. Then, the precipitate is recovered through filtering and dried to 70° C. in an oven. As a result, 13.6 g (0.017 mol) of DCP306 (2,5-di(1-(4-(trans-4-n-propylcyclohexyl)phenoxy)hexoxy)terephthalic acid, Chemical Formula 19) is obtained in the form of white powder.

[Chemical Formula 19]

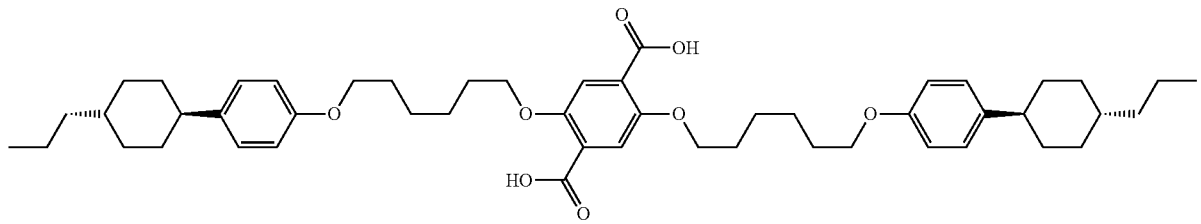

Figure 5:
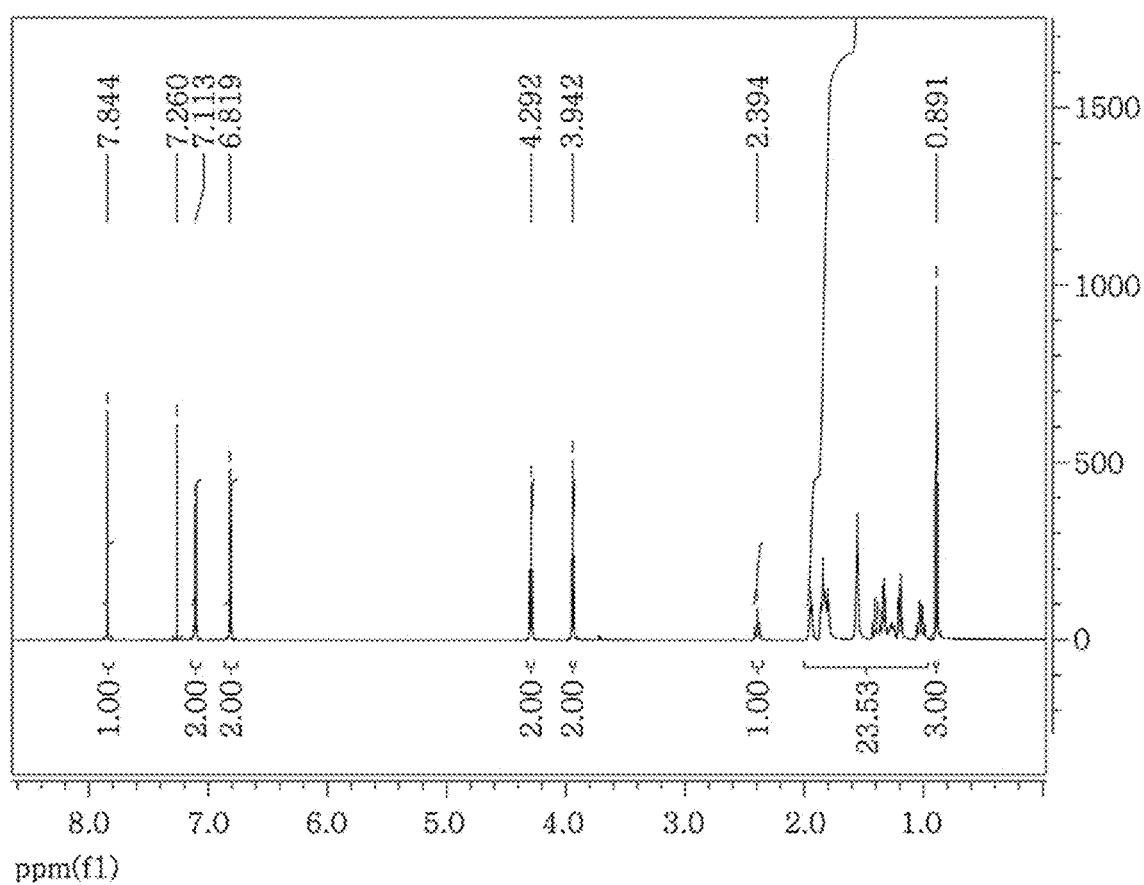
FIG. 5 shows a $^1$H NMR spectrum of DCP306 obtained according to Example 3.
Figure 6:
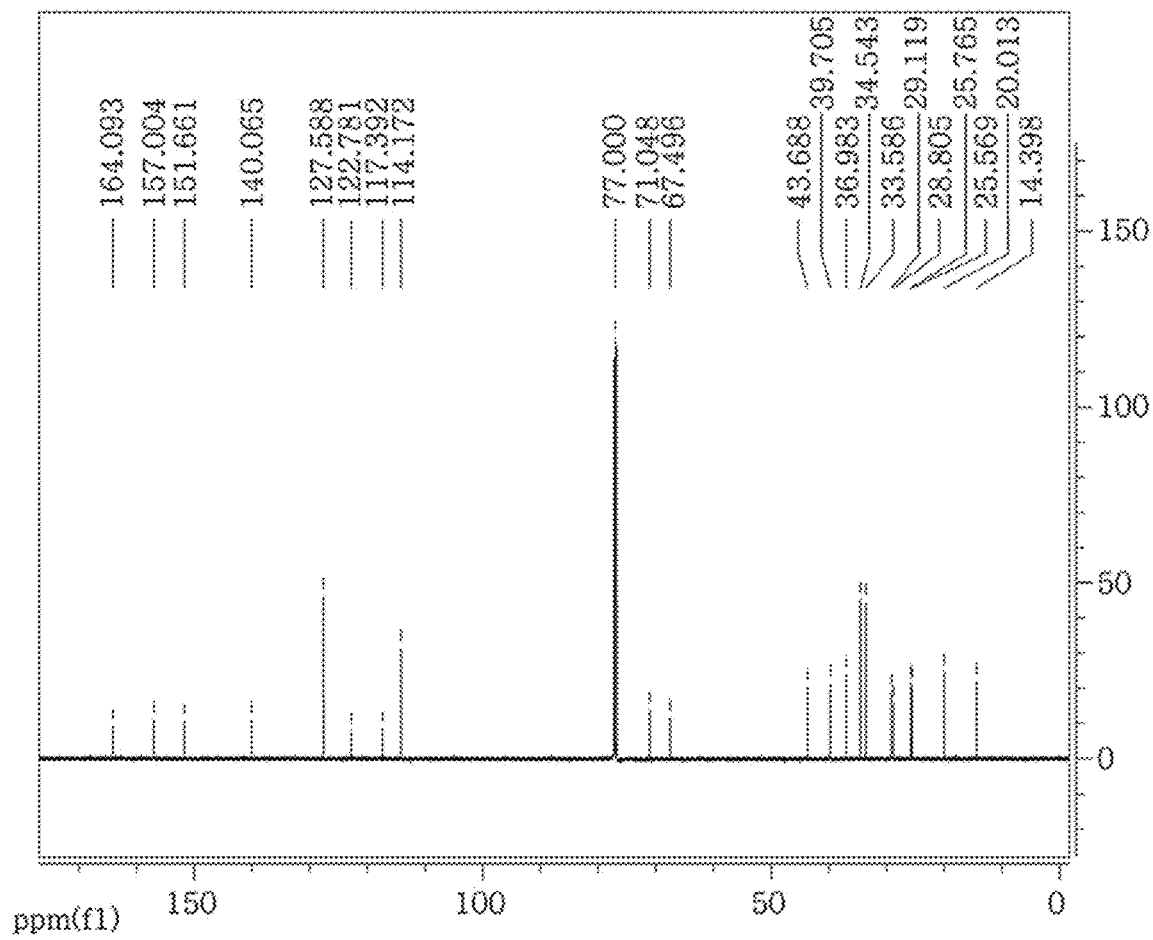
FIG. 6 shows a $^{13}$C NMR spectrum of DCP306 obtained according to Example 3.

FIG. 5 shows a ¹H NMR spectrum of DCP306 obtained according to Example 3, and FIG. 6 shows a ¹³C NMR spectrum of DCP306 obtained according to Example 3.

Example 4: Synthesis of Liquid Crystalline Epoxy Compound (DGP306)

The liquid crystalline carboxylic acid derivative used in Example 4 is DCP306 obtained from Example 3, and 1,2-epoxy-(n+2)-alkyl alcohol is glycidol (n=1). First, 13.6 g (0.017 mol) of DCP306 is introduced to a 500 mL 2-necked round bottom flask and the internal air is substituted with argon gas. Next, 360 mL of dichloromethane (available from Daejung Chemicals and Metals Co., Ltd.) is introduced thereto and the reaction mixture is cooled to 0° C. Then, 0.33 g (0.003 mol) of 4-dimethylaminopyriidine (DMAP, available from TCI) is introduced thereto, 11.5 g (0.16 mol) of glycidol (available from Sigma-Aldrich) is also introduced, and 22.7 g (0.11 mol) of N,N'-dicyclohexylcarbodiimide (DCC, available from Alfa-Aesar) is further introduced thereto and reaction is carried out at room temperature for 2 hours. After the completion of the reaction, 200 mL of dichloromethane (available from Daejung Chemicals and Metals Co., Ltd.) is further introduced to carry out extraction, followed by washing with 300 mL of aqueous saturated saline and drying over sodium sulfate (available from Daejung Chemicals & Metals Co., Ltd.). The resultant organic layer solution is subjected to chromatography on silica gel using dichloromethane as an eluent. Then, white powder is recovered and subjected to recrystallization using chloroform (available from Daejung Chemicals & Metals Co., Ltd.) and ethanol (available from Daejung Chemicals & Metals Co., Ltd.), followed by drying in a vacuum oven. As a result, 10.9 g (0.012 mol) of DGP306 (diethyl 2,5-di(1-(4-(trans-4-n-propylcyclohexyl)phenoxy)hexoxy)terephthalate, Chemical Formula 20) is obtained in the form of white powder.

Figure 7:
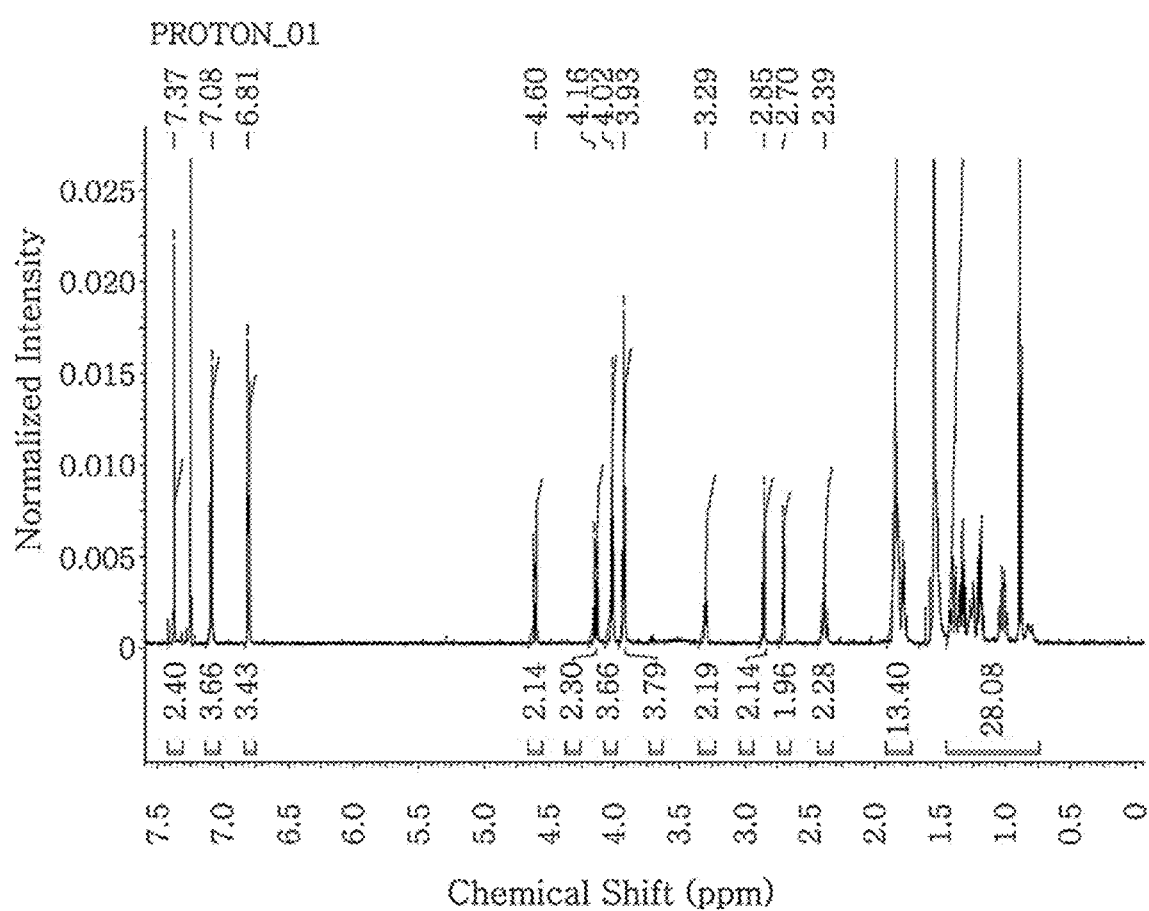
FIG. 7 shows a $^1$H NMR spectrum of DGP306 obtained according to Example 4.
Figure 8:
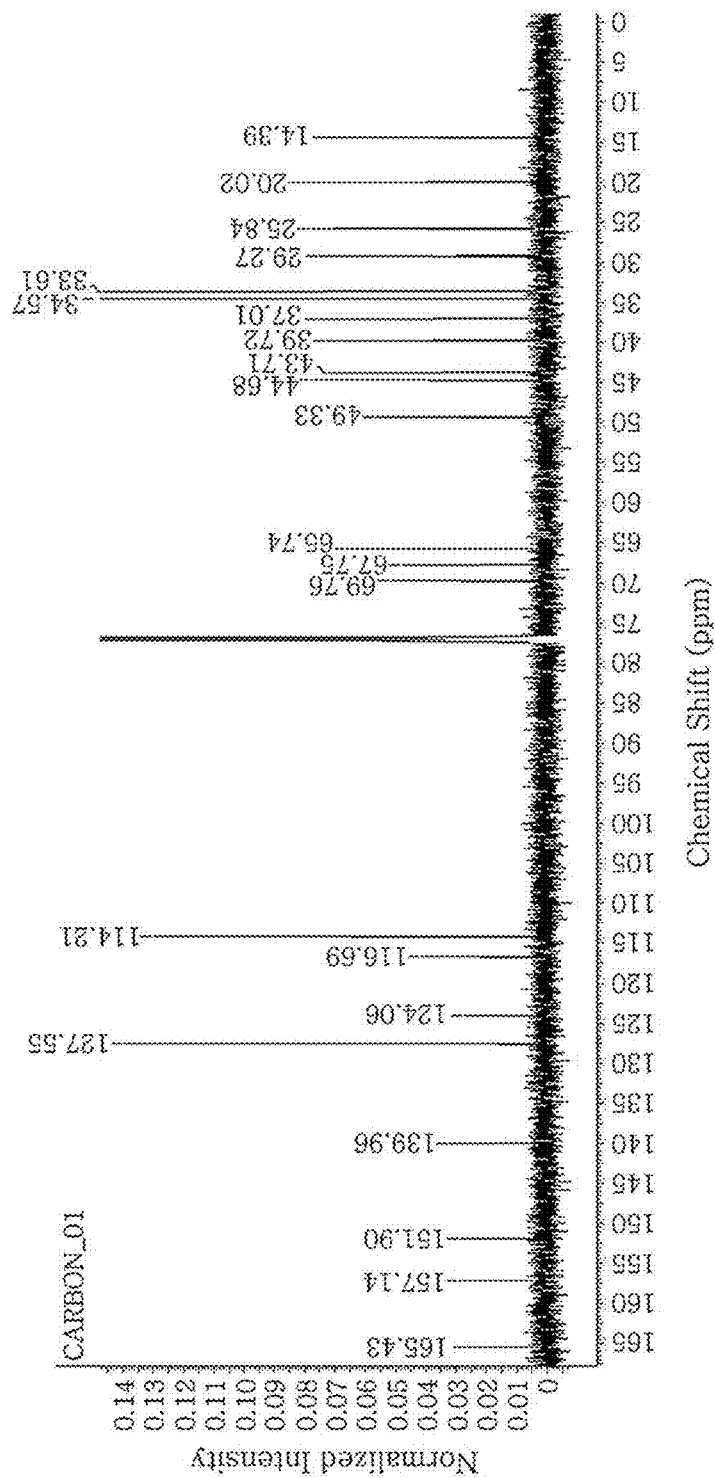
FIG. 8 shows a $^{13}$C NMR spectrum of DGP306 obtained according to Example 4.
Figure 9:
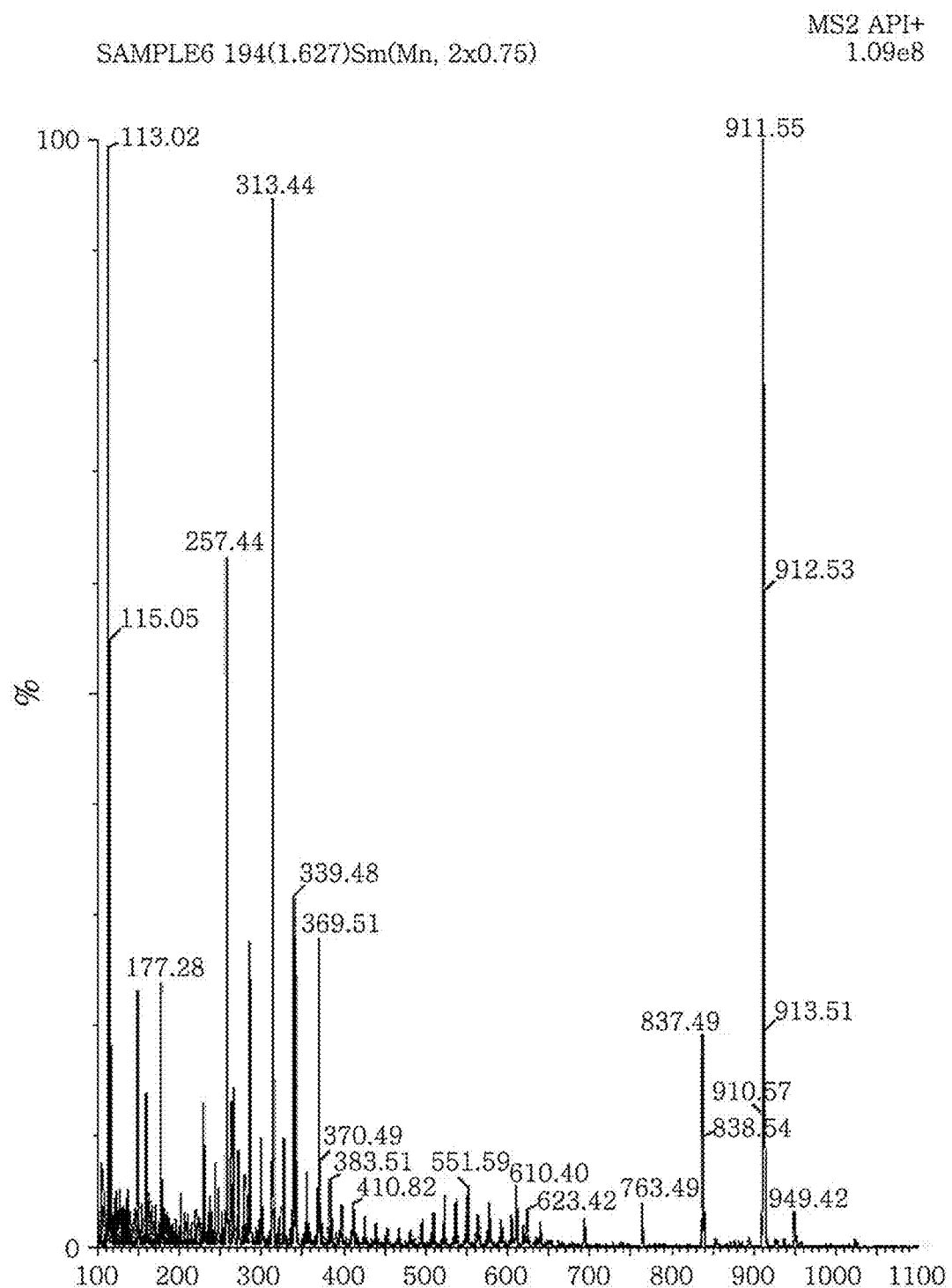
FIG. 9 shows a spectrum of electron ionization mass spectrometry (EI-MS) for DEP306 obtained according to Example 2.

FIG. 7 shows a ¹H NMR spectrum of DGP306 obtained according to Example 4, FIG. 8 shows a ¹³C NMR spectrum of DGP306 obtained according to Example 4, and FIG. 9 shows a spectrum of electron ionization mass spectrometry (EI-MS) for DGP306 obtained according to Example 4.

Experiment 2—Synthesis of Liquid Crystalline Epoxy Compound Represented by Chemical Formula 2

In Examples 5 to 9, five steps of (E), (F), (G), (H) and (I) for preparing a liquid crystalline epoxy compound represented by Chemical Formula 2 are described, wherein (4-(trans-4-n-propylcyclohexyl)phenoxy) group is used as a mesogen group, 6-bromo-1-hexanol (n=6) is used as an haloalkyl alcohol, and epichlorohydrin (n=1) is used as a 1-halo-(n+1, n+2)-epoxyalkane. The compounds produced from each of the steps are designated as PCH306OH, DTTA, DP306DT, DP306DH and DP306DG.

Example 5: Synthesis of Liquid Crystalline Alcohol Derivative (PCH306OH)

The liquid crystalline alcohol compound used in Example 5 is 4-(trans-4-n-propylcyclohexyl)phenol, and 1-haloglakyl alcohol is 6-bromo-1-hexanol (n=6, X=Br). First, 3.0 g (0.014 mol) of 4-(trans-4-n-propylcyclohexyl)phenol (available from Kanto Chemical), 3.8 g (0.027 mol) of potassium carbonate (available from Daejung Chemicals & Metals Co., Ltd.) and 0.2 g (0.0008 mol) of 18-crown-6 (1,4,7,10,13,16-hexaoxacyclooctadecane, available from Daejung Chemicals & Metals Co., Ltd.) are introduced to a 500 mL 2-necked round bottom flask, and the internal air is substituted with argon gas. Next, 150 mL of N,N-dimethylformamide (DMF, anhydrous, available from Sigma-Aldrich) is introduced thereto and reaction is carried out at room temperature for 30 minutes. Then, 2.5 g (0.014 mol) of

[Chemical Formula 20]

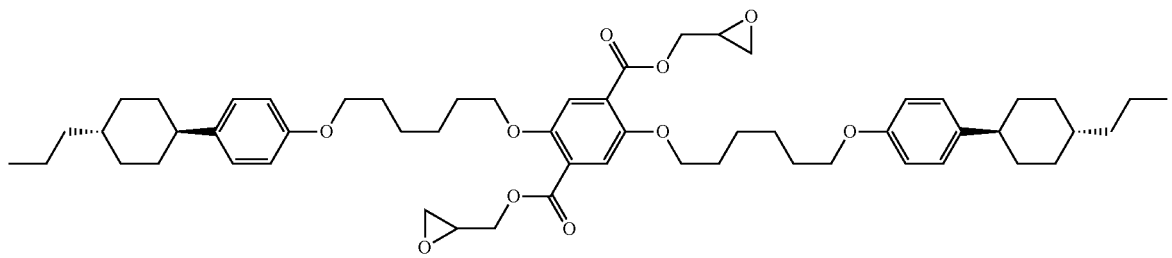

6-bromo-1-hexanol (available from TCI) is introduced thereto and reaction is carried out at 110° C. for 3 days. After the completion of the reaction, the reaction mixture is extracted with 300 mL of ethyl acetate, washed with 300 mL of water and 300 mL of aqueous saturated saline, and dried over sodium sulfate (available from Daejung Chemicals & Metals Co., Ltd.). The resultant organic layer solution is subjected to chromatography using chloroform (available from Daejung Chemicals & Metals Co., Ltd.) as an eluent and dried in a vacuum oven. As a result, 2.5 g (0.008 mol) of PCH 306OH (1-(1-hydroxyhexoxy)-4-(trans-4-n-propylcyclohexyl)benzene, Chemical Formula 21) is obtained in the form of white powder.

[Chemical Formula 21]

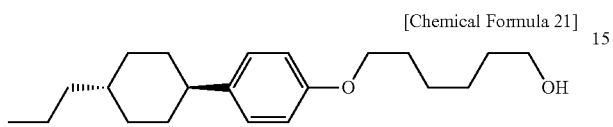

Example 6: Synthesis of Hydroxyl-Protected Carboxylic Acid Derivative (DTTA)

The protecting group used in Example 6 is tert-butyldimethylsilyl. First, 19.8 g (0.1 mol) of 2,5-dihydroxyterephthalic acid (available from Sigma-Aldrich), 75.4 g (0.5 mol) of tert-butyldimethylsilyl chloride (TBSCl, available from Sigma-Aldrich), and 47.7 g (0.7 mol) of imidazole (available from Daejung Chemicals & metals Co., Ltd.) are introduced to a 1 L 2-necked round bottom flask and the internal air is substituted with argon gas. Next, 500 mL of N,N-dimethylformamide (DMF, anhydrous, available from Sigma-Aldrich) is introduced thereto and reaction is carried out at 60° C. for 1 day. After the completion of the reaction, the solution is extracted with 1 L of hexane (available from Daejung Chemicals & Metals Co., Ltd.), washed with 500 mL of water and 500 mL of aqueous saturated saline, and dried over sodium sulfate (available from Daejung Chemicals & Metals Co., Ltd.). Then, hexane in the resultant organic layer solution is removed by using a rotary evaporator (available from EYELA). As a result, 62.2 g (0.095 mol) of di-tert-butyldimethylsiloxyl 2,5-di(tert-butyldimethylsiloxy)terephthalate is obtained in the form of white powder.

Then, 62.2 g (0.095 mol) of the resultant di-tert-butyldimethylsiloxyl 2,5-di(tert-butyldimethylsiloxy)terephthalate, 200 mL of tetrahydrofuran (THF, Daejung Chemicals & Metals Co., Ltd.), 600 mL of acetic acid (available from Wako) and 200 mL of distilled water are introduced to a 2 L 1-necked round bottom flask and reaction is carried out at room temperature for 3 hours. After the completion of the reaction, 1 L of distilled water is further added thereto and the reaction mixture is cooled to 0° C. to cause precipitation. Then, the precipitate is recovered through filtering and dried in a vacuum oven. As a result, 40.5 g (0.095 mol) of DTTA (3,5-di(tert-butyldimethylsiloxy)terephthalic acid, Chemical Formula 22) is obtained in the form of white powder.

[Chemical Formula 22]

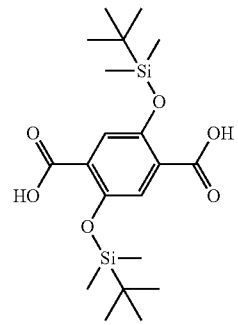

Example 7: Synthesis of Liquid Crystalline Ester Derivative (DP306DT)

The liquid crystalline alcohol derivative used in Example 7 is PCH306OH obtained from example 5, and the carboxylic acid derivative is DTTA obtained from Example 6. First, 1.2 g (0.004 mol) of PCH306OH, 0.9 g (0.002 mol) of DTTA, 0.11 g (0.001 mol) of 4-dimethylaminopyridine (DMAP, available from TCI), and 1.0 g (0.005 mol) of N,N'-dicyclohexylcarbodiimide (DCC, available from Alfa-Aesar) are introduced to a 300 mL 2-necked round bottom flask, and the internal air is substituted with argon gas. Next, 100 mL of dichloromethane (available from Daejung Chemicals & Metals Co., Ltd.) is introduced thereto and reaction is carried out at room temperature for 1 day. After the completion of the reaction, 200 mL of dichloromethane (available from Daejung Chemicals & Metals Co., Ltd.) is further introduced thereto to carry out extraction and the reaction mixture is washed with 200 mL of aqueous saturated saline and dried over sodium sulfate (available from Daejung Chemicals & Metals Co., Ltd.). The resultant organic layer solution is subjected to chromatography on silica gel using dichloromethane as an eluent. Then, the resultant white powder is recrystallized with chloroform (available from Daejung Chemicals & Metals Co., Ltd.) and ethanol (available from Daejung Chemicals & Metals Co., Ltd.), and dried in a vacuum oven. As a result, 2.1 g (0.002 mol) of DP306DT (di(1-(4-(trans-4-n-propylcyclohexyl)phenoxy)hexoxyl 3,5-di(tert-butyldimethylsiloxy)terephthalate, Chemical Formula 23) is obtained in the form of white powder.

[Chemical Formula 23]

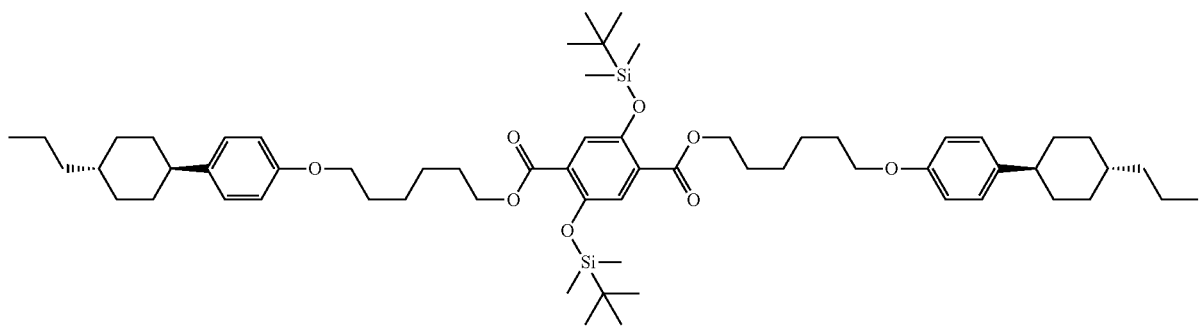

Example 8: Synthesis of Hydroxyl-Deprotected Liquid Crystalline Ester Derivative (DP306DH)

The liquid crystalline ester derivative used in Example 8 is DP306DT obtained from Example 7. First, 2.1 g (0.002 mol) of DP306DT is introduced to a 100 mL of 2-necked round bottom flask and the internal air is substituted with argon gas. Next, 10 mL of tetrahydrofuran (THF, anhydrous, available from Sigma-Aldrich) is introduced thereto, followed by cooling to 0° C. Then, 1.3 g (0.005 mol) of tetra-n-butylammonium fluoride (TBAF, available from TCI) is introduced and reaction is carried out at room temperature for 3 hours. After the completion of the reaction, the reaction mixture is extracted with 30 mL of ethyl acetate (available from Daejung Chemicals & Metals Co., Ltd.), washed with 50 mL of aqueous saturated saline and dried over sodium sulfate (available from Daejung Chemicals & Metals Co., Ltd.). The resultant organic layer solution is subjected to chromatography on silica gel using dichloromethane as an eluent. As a result, 1.6 g (0.002 mol) of DP306DH (di(1-(4-(trans-4-n-propylcyclohexyl)phenoxy)hexoxyl) 2,5-dihydroxy terephthalate, Chemical Formula 24) is obtained in the form of white powder.

[Chemical Formula 24]

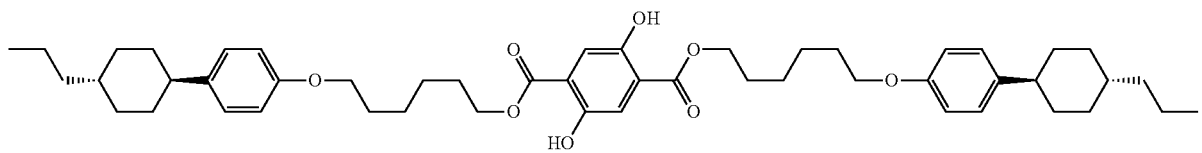

Example 9: Synthesis of Liquid Crystalline Epoxy Compound (DP306DG)

The liquid crystalline ester derivative used in Example 9 is DP306DH obtained from Example 8, and 1-halo-(n+1,n+2)-epoxyalkane is epichlorohydrin (n=1, X=Cl). First, 1.6 g (0.002 mol) of DP306DH and 0.06 g (0.0002 mol) of tetrabutylammonium bromide (TBAB, available from TCI) are introduced to a 3-necked round bottom flask equipped with a reflux device, and the internal air is substituted with argon gas. Next, 0.8 g (0.009 mol) of epichlorohydrin (available from Sigma-Aldrich) is introduced thereto and the reaction mixture is heated to 60° C. Then, 0.2 g (0.005 mol) of sodium hydroxide (available from Daejung Chemicals & Metals Co., Ltd.) is introduced and reaction is carried out at 120° C. for 1 day. After the completion of the reaction, sodium chloride as insoluble salt is removed through filtering, and the residual epichlorohydrin is removed by using a rotary evaporator (available from EYELA). The resultant white powder is recrystallized with chloroform (available from Daejung Chemicals & Metals Co., Ltd.) and ethanol (available from Daejung Chemicals & Metals Co., Ltd.). As a result, 1.8 g (0.002 mol) of DP306DG (di(1-(4-(trans-4-n-propylcyclohexyl)phenoxy)hexoxyl) 2,5-diglycidyloxy-terephthalate, Chemical Formula 25) is obtained in the form of white powder.

[Chemical Formula 25]

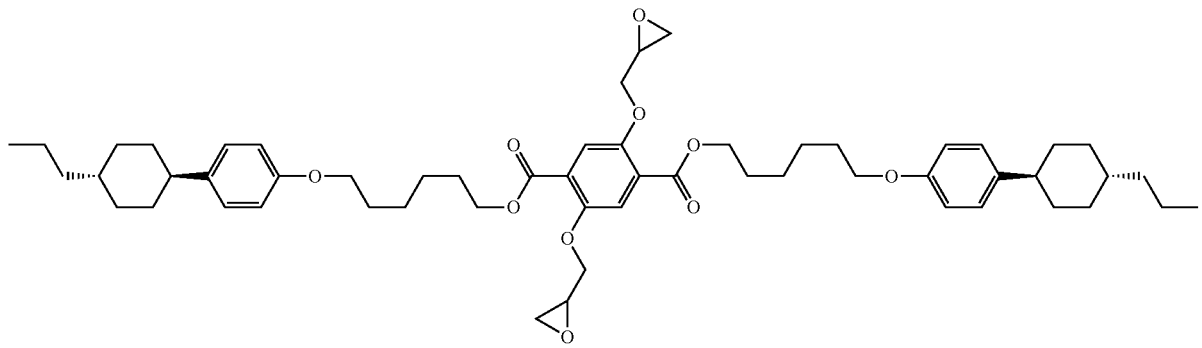

Experiment 3—Synthesis of Liquid Crystalline Epoxy Compound Represented by Chemical Formula 3

In Examples 10 to 13, four steps among the five steps of (J), (K), (L), (M) and (N) for preparing a liquid crystalline epoxy compound represented by Chemical Formula 3 are described, except step (J) which is the same as step (E) described in Example 5, wherein (4-(trans-4-n-propylcyclohexyl)phenoxy) group is used as a mesogen group, 6-bromo-1-hexanol (n=6) is used as an haloalkyl alcohol, and epichlorohydrin (n=1) is used as a 1-halo-(n+1, n+2)-epoxyalkane. The compounds produced from each of the steps are designated as DTBA, P306DT, P306DH and P306DG.

Example 10: Synthesis of Hydroxyl-Protected Carboxylic Acid Derivative (DTBA)

First, 15.4 g (0.1 mol) of 3,5-dyhydroxybenzoic acid (available from Alfa-Aesar), 60.3 g (0.4 mol) of tert-butyldimethylsilyl chloride (TBSCl) and 40.8 g (0.6 mol) of imidazole (available from Daejung Chemicals & Metals Co., Ltd.) are introduced to a 1 L 2-necked round bottom flask, and the internal air is substituted with argon gas. Next, 500 mL of N,N-dimethylformamide (DMF, anhydrous, available from Sigma-Aldrich) is introduced and reaction is carried out at 60° C. for 1 day. After the completion of the reaction, the solution is extracted with 1 L of hexane (available from Daejung Chemicals & Metals Co., Ltd.), washed with 500 mL of water and 500 mL of aqueous saturated saline, and dried over sodium sulfate (available from Daejung Chemicals & Metals Co., Ltd.). Hexane in the resultant organic layer solution is removed by using a rotary evaporator (available from EYELA). As a result, 47.2 g (0.095 mol) of tert-butyldimethylsiloxyl 3,5-di(tert-butyldimethylsiloxy)benzoate is obtained in the form of white powder.

Then, 47.2 g (0.095 mol) of the resultant of tert-butyldimethylsiloxyl 3,5-di(tert-butyldimethylsiloxy)benzoate, 200 mL of tetrahydrofuran (THF, available from Daejung Chemicals & Metals Co., Ltd.), 600 mL of acetic acid (available from Wako) and 200 mL of distilled water are introduced to a 2 L 1-necked round bottom flask, and reaction is carried out at room temperature for 3 hours. After the completion of the reaction, 1 L of distilled water is further added thereto and the reaction mixture is cooled to 0° C. to cause precipitation. After that, the precipitate is recovered through filtering and dried in a vacuum oven. As a result, 36.4 g (0.095 mol) of DTBA (3,5-di(tert-butyldimethylsiloxy)benzoic acid, Chemical Formula 26) is obtained in the form of white powder.

[Chemical Formula 26]

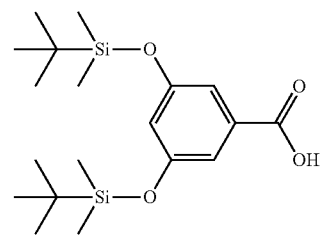

Example 11: Synthesis of Liquid Crystalline Ester Derivative (P306DT)

The liquid crystalline alcohol derivative used in Example 11 is PCH306OH obtained from Example 5 and carboxylic acid derivative is DTBA obtained from Example 10. First, 1.2 g (0.004 mol) of PCH306OH, 1.7 g (0.004 mol) of DTBA, 0.11 g (0.001 ml) of dimethylaminopyridine (DMAP, available from TCI) and 1.0 g (0.005 mol) of N,N'-dicyclohexylcarbodiimide (DCC, available from Alfa-Aesar) are introduced to a 300 mL 2-necked round bottom flask, and the internal air is substituted with argon gas. Next, 100 mL of dichloromethane (available from Daejung Chemicals & Metals, Co., Ltd.) is introduced and reaction is carried out at room temperature for 1 day. After the completion of the reaction, 200 mL of dichloromethane (available from Daejung Chemicals & Metals Co., Ltd.) is further introduced to carry out extraction, and the reaction mixture is washed with 200 mL of aqueous saturated saline and dried over sodium sulfate (available from Daejung Chemicals & Metals Co., Ltd.). The resultant organic layer solution is subjected to chromatography using dichloromethane as an eluent. Then, white powder is recovered and subjected to recrystallization with chloroform (available from Daejung Chemicals & Metals Co., Ltd.) and ethanol (available from Daejung Chemicals & Metals Co., Ltd.). As a result, 2.7 g (0.004 mol) of P306DT (1-(4-(trans-4-n-propylcyclohexyl) phenoxy)hexoxyl 3,5-di(tert-butyldimethylsiloxy)benzoate, Chemical Formula 27) is obtained in the form of white powder.

[Chemical Formula 27]

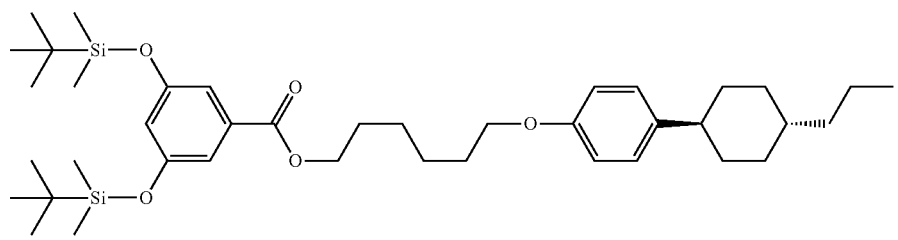

Example 12: Synthesis of Hydroxyl-Deprotected Liquid Crystalline Ester Derivative (P306DH)

The liquid crystalline ester derivative used in Example 12 is P306DT obtained from Example 11. First, 2.7 g (0.004 mol) of P306DT is introduced to a 100 mL of 2-necked round bottom flask and the internal air is substituted with argon gas. Next, 10 mL of tetrahydrofuran (THF, anhydrous, available from Sigma-Aldrich) is introduced thereto, followed by cooling to 0° C. Then, 2.6 g (0.01 mol) of tetra-n-butylammonium fluoride (TBAF, available from TCI) is introduced and reaction is carried out at room temperature for 3 hours. After the completion of the reaction, the reaction mixture is extracted with 30 mL of ethyl acetate (available from Daejung Chemicals & Metals Co., Ltd.), washed with 50 mL of aqueous saturated saline and dried over sodium sulfate (available from Daejung Chemicals & Metals Co., Ltd.). The resultant organic layer solution is subjected to chromatography on silica gel using dichloromethane as an eluent. As a result, 1.8 g (0.004 mol) of P306DH (1-(4-(trans-4-n-propylcyclohexyl)phenoxy)hexoxyl) 3,5-dihydroxybenzolate, Chemical Formula 28) is obtained in the form of white powder.

[Analysis of Liquid Crystallinity of Liquid Crystalline Compounds Obtained from Examples 2 and 4]

Figure 10:
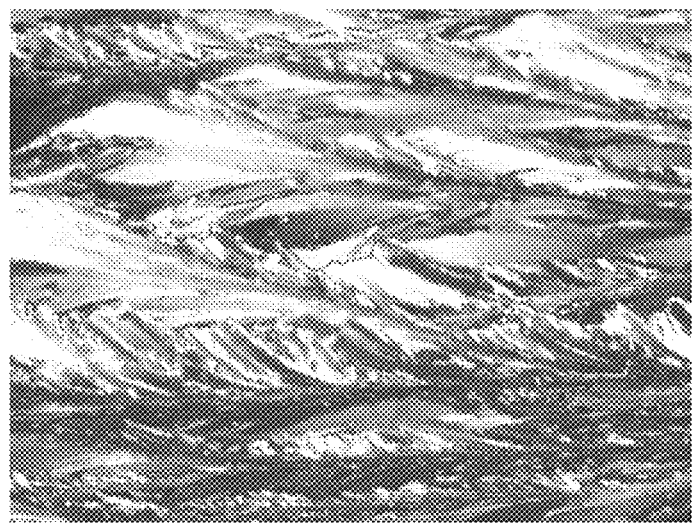
FIG. 10 shows the results of DEP 306 obtained according to Example 2 at 90° C. during its cooling, as determined by polarization microscopy.
Figure 11:
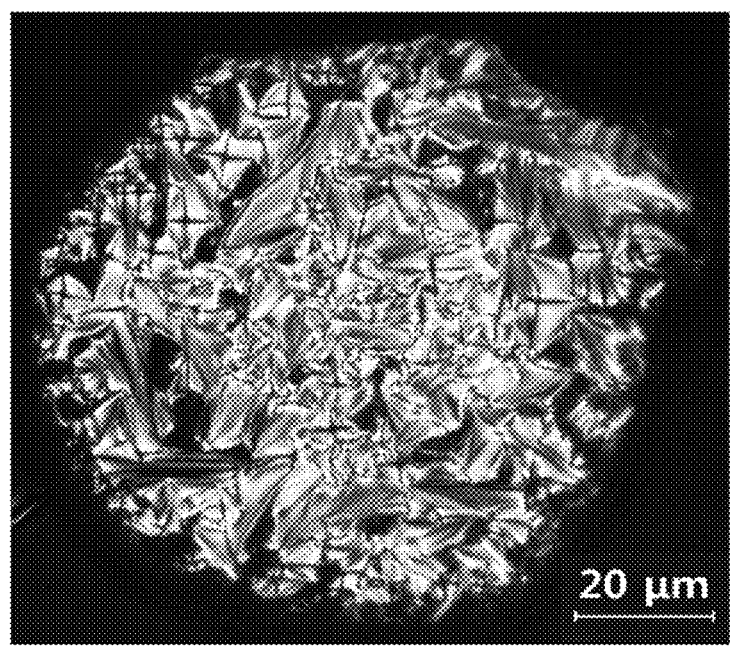
FIG. 11 shows the results of DGP 306 obtained according to Example 4 at 95° C. during its cooling, as determined by polarization microscopy.

The following Table 1 shows phase change temperatures obtained from the results of DSC determination of DEP306 and DGP306 obtained from Examples 2 and 4. In addition, FIG. 10 shows the results of DEP 306 obtained according to Example 2 at 90° C. during its cooling, as determined by polarization microscopy, and FIG. 11 shows the results of DGP 306 obtained according to Example 4 at 95° C. during its cooling, as determined by polarization microscopy.

[Chemical Formula 28]

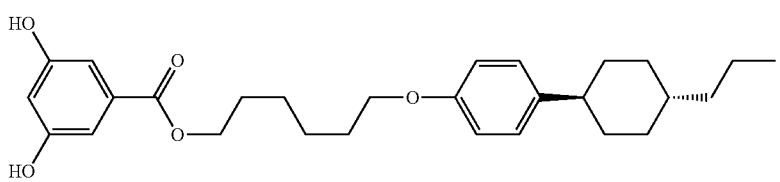

Example 13: Synthesis of Liquid Crystalline Epoxy (P306DG)

The liquid crystalline ester derivative used in Example 13 is P306DH obtained from Example 12, and 1-halo-(n+1,n+2)-epoxyalkane is epichlorohydrin (n=1, X=Cl). First, 1.8 g (0.004 mol) of P306DH and 0.12 g (0.0004 mol) of tetrabutylammonium bromide (TBAB, available from TCI) are introduced to a 3-necked round bottom flask equipped with a reflux device, and the internal air is substituted with argon gas. Next, 1.7 g (0.018 mol) of epichlorohydrin (available from Sigma-Aldrich) is introduced thereto and the reaction mixture is heated to 60° C. Then, 0.4 g (0.01 mol) of sodium hydroxide (available from Daejung Chemicals & Metals Co., Ltd.) is introduced and reaction is carried out at 120° C. for 1 day. After the completion of the reaction, sodium chloride as insoluble salt is removed through filtering, and the residual epichlorohydrin is removed by using a rotary evaporator (available from EYELA). The resultant white powder is recrystallized with chloroform (available from Daejung Chemicals & Metals Co., Ltd.) and ethanol (available from Daejung Chemicals & Metals Co., Ltd.). As a result, 2.3 g (0.04 mol) of P306DG (1-(4-(trans-4-n-propylcyclohexyl)phenoxy)hexoxyl) 2,5-diglycidyloxybenzoate, Chemical Formula 29) is obtained in the form of white powder.

TABLE 1

| | Temperature Change | Phase change temperature 1 (Crystal-liquid crystal | Phase change temperature 2 (Liquid crystal-liquid phase) |
| --- | --- | --- | --- |
| DEP306 | Cooling | 56.7 | 65.5 |
| | Heating | 88.4 | 99.3 |
| DGP306 | Cooling | 94.1 | 95.5 |
| | Heating | 119.2 | 124.2 |

As can be seen from Table 1, both compounds undergo two phase changes (crystal-liquid crystal, liquid crystal-liquid phase) during heating and cooling, and thus have liquid crystallinity. It can be also seen from FIG. 10 and FIG. 11 that both compounds show a smectic type liquid crystal phase in a liquid crystal state.

Experiment 4—Preparation of Cured Resin Product Using Liquid Crystalline Epoxy Compound In Example 14, a method for preparing a cured resin product will be described, wherein DGP306 obtained from Example 4 is used as an epoxy compound and p-phenylenediamine is used as a curing agent. In addition, in Example 15, a method for preparing a cured resin product will be

[Chemical Formula 29]

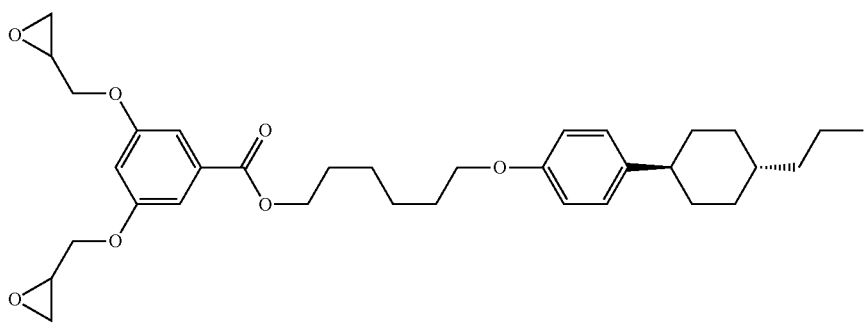

described, wherein DGP306 is used as an epoxy compound, p-phenylenediamine is used as a curing agent, and aluminum oxide is used as a heat conductive filler.

Meanwhile, in Comparative Example 1, a method for preparing a cured resin product will be described, wherein YD128 (available from Kukdo Chemicals) corresponding to a known DGEBA type epoxy compound is used as an epoxy compound and p-phenylenediamine is used as a curing agent. In Comparative Example 2, a method for preparing a cured resin product will be described, wherein YD128 is used as an epoxy compound, p-phenylenediamine is used as a curing agent, and aluminum oxide is used as a heat conductive filler. Additionally, in Comparative Example 3, a method for preparing a cured resin product will be described, wherein SE-400H (available from SHIN-A T&C) corresponding to a known crystalline epoxy compound is used as an epoxy compound and p-phenylenediamine is used as a curing agent. In Comparative Example 4, a method for preparing a cured resin product will be described, wherein SE-400H is used as an epoxy compound, p-phenylenediamine is used as a curing agent, and aluminum oxide is used as a heat conductive filler.

Example 14: Preparation of Cured Product of Liquid Crystalline Epoxy Compound Using DGP306

The epoxy compound used in Example 14 is DGP306 obtained from Example 4. The curing agent is p-phenylenediamine (available from Sigma-Aldrich) represented by the following Chemical Formula 30:

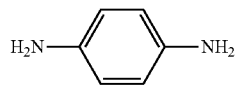

[Chemical Formula 30]

First, 5.5 g (0.006 mol) of DGP306 and 0.3 g (0.003 mol) of p-phenylenediamine are mixed and pulverized by using a mortar. Next, the mixture is pressurized and cured under a pressure of 1 MPa at 90° C. for 2 hours and further pressurized and cured under a pressure of 1 MPa at 150° C. for 2 hours by using a hot press, thereby providing a disc-like cured resin product having a diameter of 3 cm.

Example 15: Preparation of Cured Product of Liquid Crystalline Epoxy Compound Using DGP306

The epoxy compound used in Example 15 is DGP306 obtained from Example 4. The curing agent is p-phenylenediamine (available from Sigma-Aldrich) which is the same as used in Example 14. The heat conductive filler used in Example 15 is aluminum oxide powder (available from Sigma-Aldrich) having an average diameter of 150 μm or less. It is known that the heat conductive filler has a heat conductivity of about 30 W/mK.

First, 5.5 g (0.006 mol) of DGP306, 0.3 g (0.003 mol) of p-phenylenediamine and 1.5 g (20.5 wt % based on the total weight of epoxy compound+curing agent+heat conductive filler) of aluminum oxide are mixed and pulverized by using a mortar. Next, the mixture is pressurized and cured under a pressure of 1 MPa at 90° C. for 2 hours and further pressurized and cured under a pressure of 1 MPa at 150° C. for 2 hours by using a hot press, thereby providing a disc-like cured resin product having a diameter of 3 cm.

Comparative Example 1: Preparation of Cured Epoxy Resin Product Using YD128

The epoxy compound used in Comparative Example 1 is YD128 (available from Kukdo Chemicals), a known bisphenol A diglycidyl ether (DGEBA) type epoxy compound. The curing agent used in Comparative Example 1 is p-phenylenediamine (available from Sigma-Aldrich) which is the same as used in Example 14. The amount of each of YD128 and p-phenylenediamine in Comparative Example 1 is calculated based on the epoxy equivalent (185 g/eq) of YD128, active hydrogen equivalent (27 g/eq) of p-phenylenediamine and the following Mathematical Formula 1:

Amount of Curing Agent=(Equivalent of Active Hydrogen+Amount of Epoxy)/Equivalent of Epoxy     [Mathematical Formula 1]

First, 5.5 g of YD128 and 0.8 g of p-phenylenediamine are mixed by using an agitator (available from Thinky) and introduced to a circular aluminum dish having a diameter of 3 cm. Then, the mixture is cured at 70° C. for 2 hours and 130° C. for 2 hours by using an oven to obtain a disc type cured resin product having a diameter of 3 cm.

Comparative Example 2: Preparation of Cured Epoxy Resin Product Using YD128

The epoxy compound used in Comparative Example 2 is YD128 (available from Kukdo Chemicals) which is the same as used in Comparative Example 1. The curing agent used in Comparative Example 2 is p-phenylenediamine (available from Sigma-Aldrich) which is the same as used in Example 14. The amount of each of YD128 and p-phenylenediamine in Comparative Example 2 is the same as used in Comparative Example 1. The heat conductive filler used in Comparative Example 2 is aluminum oxide powder (available from Sigma-Aldrich) which is the same as used in Example 15.

First, 5.5 g of YD128, 0.8 g of p-phenylenediamine and 1.6 g (20.3 wt % based on the total weight of epoxy compound+curing agent+heat conductive filler) of aluminum oxide powder are mixed by using an agitator (available from Thinky) and introduced to a circular aluminum dish having a diameter of 3 cm. Then, the mixture is cured at 70° C. for 2 hours and 130° C. for 2 hours by using an oven to obtain a disc type cured resin product having a diameter of 3 cm.

Comparative Example 3: Preparation of Cured Product of Liquid Crystalline Epoxy Resin Using SE-400H The epoxy compound used in Comparative Example 3 is SE-400H (available from SHIN-A T&Cs), a known crystalline epoxy compound. The curing agent used in Comparative Example 3 is p-phenylenediamine (available from Sigma-Aldrich) which is the same as used in Example 14. The amount of each of SE-400H and p-phenylenediamine in Comparative Example 3 is calculated based on the epoxy equivalent (184 g/eq) of SE-400H, active hydrogen equivalent (27 g/eq) of p-phenylenediamine and the above Mathematical Formula 1.

First, 5.5 g of YD128 and 0.8 g of p-phenylenediamine are mixed by using an agitator (available from Thinky) and introduced to a circular aluminum dish having a diameter of 3 cm. Then, the mixture is cured at 110° C. for 2 hours and 140° C. for 2 hours by using an oven to obtain a disc type cured resin product having a diameter of 3 cm.

Comparative Example 4: Preparation of Cured Product of Liquid Crystalline Epoxy Resin Using SE-400H The epoxy compound used in Comparative Example 4 is SE-400H (available from SHIN-A T&C) which is the same as used in Comparative Example 3. The curing agent used in Comparative Example 4 is p-phenylenediamine (available from Sigma-Aldrich) which is the same as used in Example 14. The amount of each of SE-400H and p-phenylenediamine in Comparative Example 4 is the same as used in Comparative Example 3. The heat conductive filler used in Comparative Example 4 is aluminum oxide powder (available from Sigma-Aldrich) which is the same as used in Example 15.

First, 5.5 g of SE-400H, 0.8 g of p-phenylenediamine and 1.6 g (20.3 wt % based on the total weight of epoxy compound+curing agent+heat conductive filler) of aluminum oxide powder are mixed and pulverized by using a mortar, and introduced to a circular aluminum dish having a diameter of 3 cm. Then, the mixture is cured at 110° C. for 2 hours and 140° C. for 2 hours by using an oven to obtain a disc type cured resin product having a diameter of 3 cm.

TABLE 2

| | Epoxy compound | Curing agent | Heat conductive filler | Heat conductivity [W/mK] |
|---|---|---|---|---|
| Ex. 14 | DGP306 | p-phenylenediamine | — | 0.35 |
| Ex. 15 | | | Aluminum oxide | 0.91 |
| Comp. Ex. 1 | YD128 | | — | 0.27 |
| Comp. Ex. 2 | | | Aluminum oxide | 0.44 |
| Comp. Ex. 3 | SE-400H | | — | 0.33 |
| Comp. Ex. 4 | | | Aluminum oxide | 0.83 |

It can be seen from Table 2 that the liquid crystalline epoxy compound disclosed herein provides a cured resin product with higher heat conductivity as compared to a commercially available bisphenol A diglycidyl ether (DGEBA) type epoxy compound or crystalline epoxy compound (e.g. heat conductivity at least 75% higher than the heat conductivity of a commercially available epoxy compound).

What is claimed is:

1. A liquid crystalline epoxy compound,
wherein the liquid crystalline epoxy compound is represented by any one of the following Chemical Formulas 1-1, 2-1 and 3-1:

[Chemical Formula 1-1]

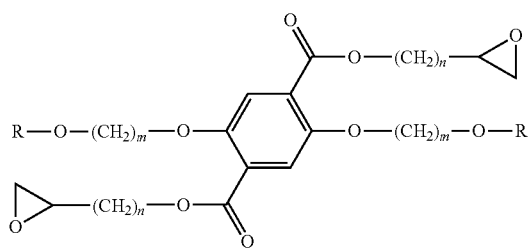

[Chemical Formula 2-1]

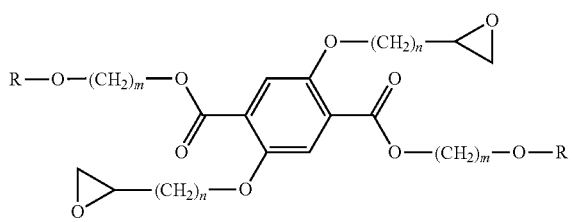

[Chemical Formula 3-1]

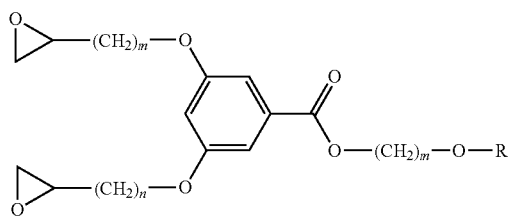

wherein R represents a mesogen group, and each of m and n independently represents an integer of 1 to 20,
wherein the mesogen group is represented by any one of the following chemical formulas:

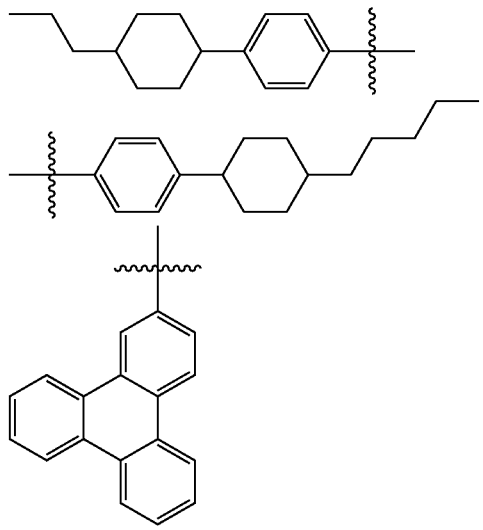

35

-continued

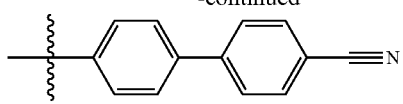

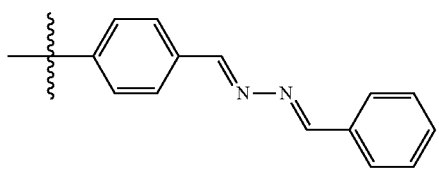

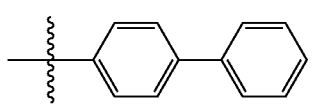

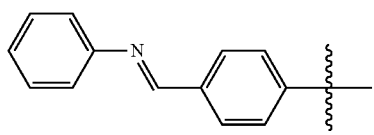

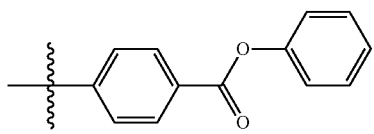

36

-continued

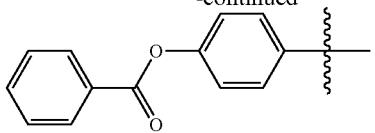

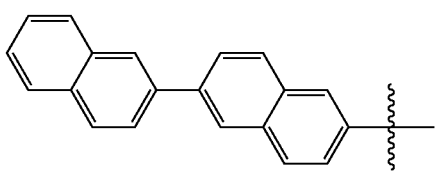

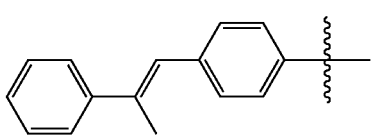

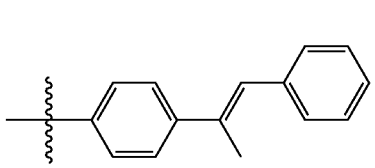 [SMILES: *c1ccc(/C(C)=C/c2ccccc2)cc1]

wherein

represents a site connected to another substituent.

2. The liquid crystalline epoxy compound of claim 1, wherein m is an integer of 2-12.

3. The liquid crystalline epoxy compound of claim 1, wherein n is an integer of 2-12.

4. The liquid crystalline epoxy compound of claim 1, wherein Chemical Formula 1-1 is represented by the Chemical Formula 20:

[Chemical Formula 20]

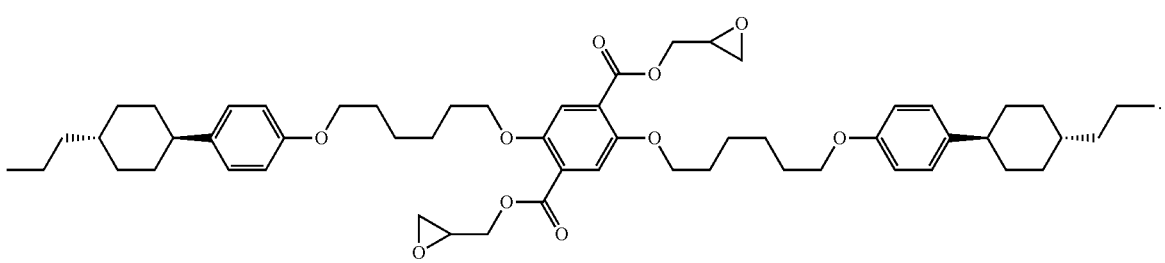

5. The liquid crystalline epoxy compound of claim 1, wherein Chemical Formula 2-1 is represented by the Chemical Formula 25:
[Chemical Formula 25]
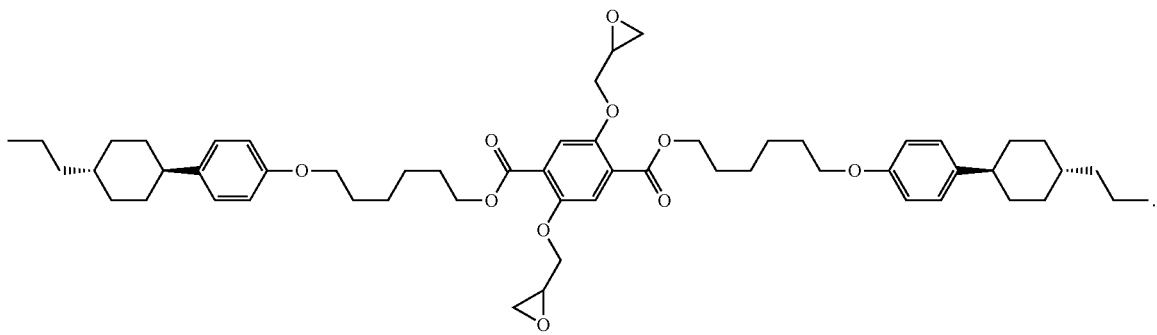
6. The liquid crystalline epoxy compound of claim 1, wherein Chemical Formula 3-1 is represented by the Chemical Formula 29:
[Chemical Formula 29]
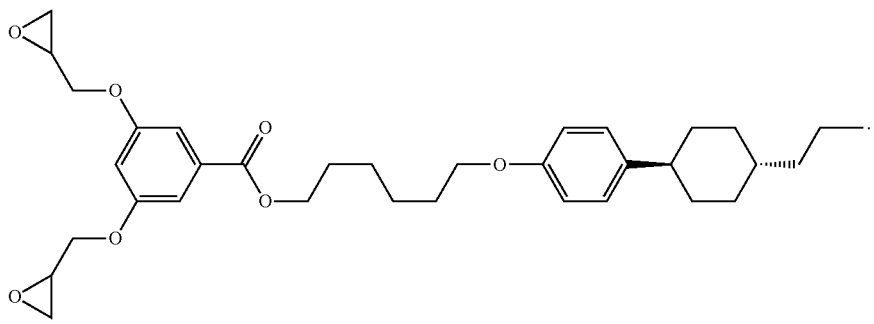
* * * * *